United States Patent
Li et al.

(10) Patent No.: US 10,891,291 B2
(45) Date of Patent: Jan. 12, 2021

(54) FACILITATING OPERATIONS ON PLUGGABLE DATABASES USING SEPARATE LOGICAL TIMESTAMP SERVICES

(71) Applicant: Oracle International Corporation, Redwood Shores, CA (US)

(72) Inventors: Yunrui Li, Fremont, CA (US); Kumar Rajamani, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 784 days.

(21) Appl. No.: 15/339,525

(22) Filed: Oct. 31, 2016

(65) Prior Publication Data

US 2018/0121511 A1    May 3, 2018

(51) Int. Cl.
*G06F 16/2453* (2019.01)
*G06F 16/951* (2019.01)
(Continued)

(52) U.S. Cl.
CPC .... *G06F 16/24549* (2019.01); *G06F 16/2282* (2019.01); *G06F 16/2358* (2019.01);
(Continued)

(58) Field of Classification Search
CPC ............... G06F 16/24549; G06F 16/27; G06F 16/2379; G06F 16/2282; G06F 16/2477;
(Continued)

(56) References Cited

U.S. PATENT DOCUMENTS 4,507,751 A    3/1985   Gawlick et al.
4,710,926 A    12/1987  Brown et al.
(Continued)

FOREIGN PATENT DOCUMENTS

EP    0 503 417 A2    9/1992
EP    050180 A       9/1992
(Continued)

OTHER PUBLICATIONS

Nadimpalli, Rajeev, "How to run two or more databases in different time zones on the same machine", May 2002 (Year: 2002).*
(Continued)

*Primary Examiner* — Alicia M Antoine
(74) *Attorney, Agent, or Firm* — Hickman Palermo Becker Bingham LLP

(57) ABSTRACT

A refreshable PDB clone is associated with a PDB-specific logical timestamp (LT) service that continuously reflects the LT of the most recent changes that have fully committed within the PDB clone during a refresh operation. Such an LT service is used to perform queries over the changing data in the PDB clone while the PDB clone is undergoing a refresh operation. Furthermore, a PDB-specific LT service can facilitate write operations in a standby CDB, where the standby CDB is a physical standby of a source CDB. Specifically, a standby CDB is configured with a private read-write PDB that does not replicate data from the source CDB. This private PDB may accommodate a write operation required by a query over data in the standby CDB. A PDB-specific LT service provides LTs for such a private PDB where the PDB-specific LT service provides LTs to order changes made within the private PDB.

24 Claims, 7 Drawing Sheets

(51) Int. Cl.
  *G06F 16/2458* (2019.01)
  *G06F 16/23* (2019.01)
  *G06F 16/22* (2019.01)
  *G06F 16/27* (2019.01)
  *G06F 16/25* (2019.01)

(52) U.S. Cl.
  CPC ...... *G06F 16/2365* (2019.01); *G06F 16/2379* (2019.01); *G06F 16/2477* (2019.01); *G06F 16/256* (2019.01); *G06F 16/27* (2019.01); *G06F 16/951* (2019.01)

(58) Field of Classification Search
  CPC .............. G06F 16/256; G06F 16/2358; G06F 16/2365; G06F 16/951
  USPC ........................................................ 707/713
  See application file for complete search history.

(56) References Cited

U.S. PATENT DOCUMENTS

| | | |
|---|---|---|
| 4,782,325 A | 11/1988 | Jeppsson et al. |
| 4,945,474 A | 7/1990 | Elliott et al. |
| 5,095,421 A | 3/1992 | Freund |
| 5,146,571 A | 9/1992 | Logan |
| 5,182,752 A | 1/1993 | DeRoo et al. |
| 5,233,618 A | 8/1993 | Gilder et al. |
| 5,241,675 A | 8/1993 | Sheth et al. |
| 5,263,156 A | 11/1993 | Bowen et al. |
| 5,287,496 A | 2/1994 | Chen et al. |
| 5,327,556 A | 7/1994 | Mohan |
| 5,329,628 A | 7/1994 | Yomamoto et al. |
| 5,333,265 A | 7/1994 | Orimo et al. |
| 5,333,316 A | 7/1994 | Champagne et al. |
| 5,355,477 A | 10/1994 | Strickland et al. |
| 5,369,757 A | 11/1994 | Spiro et al. |
| 5,388,196 A | 2/1995 | Pajak et al. |
| 5,418,940 A | 5/1995 | Mohan |
| 5,423,037 A | 6/1995 | Hvasshovd |
| 5,454,102 A | 9/1995 | Tang et al. |
| 5,487,164 A | 1/1996 | Kirchhofer et al. |
| 5,553,279 A | 9/1996 | Goldring |
| 5,555,404 A | 9/1996 | Torbjørnsen et al. |
| 5,559,991 A | 9/1996 | Kanfi |
| 5,574,906 A | 11/1996 | Morris |
| 5,581,753 A | 12/1996 | Terry et al. |
| 5,581,754 A | 12/1996 | Terry et al. |
| 5,588,012 A | 12/1996 | Oizumi |
| 5,603,024 A | 2/1997 | Goldring |
| 5,613,113 A | 3/1997 | Goldring |
| 5,696,775 A | 12/1997 | Nemazie et al. |
| 5,717,893 A | 2/1998 | Mattson |
| 5,734,898 A | 3/1998 | He |
| 5,742,792 A | 4/1998 | Yanai et al. |
| 5,778,430 A | 7/1998 | Ish et al. |
| 5,805,799 A | 9/1998 | Fredrickson et al. |
| 5,806,076 A | 9/1998 | Ngai et al. |
| 5,870,758 A | 2/1999 | Bamford et al. |
| 5,870,759 A | 2/1999 | Bauer et al. |
| 5,870,763 A | 2/1999 | Lomet |
| 5,893,930 A | 4/1999 | Song |
| 5,924,096 A | 7/1999 | Draper et al. |
| 5,956,731 A | 9/1999 | Bamford et al. |
| 5,960,436 A | 9/1999 | Chang et al. |
| 5,974,427 A | 10/1999 | Reiter |
| 5,983,277 A | 11/1999 | Heile et al. |
| 5,991,771 A | 11/1999 | Falls et al. |
| 6,009,432 A | 12/1999 | Tarin |
| 6,009,542 A | 12/1999 | Koller et al. |
| 6,014,669 A | 1/2000 | Slaughter et al. |
| 6,026,406 A | 2/2000 | Huang et al. |
| 6,044,367 A | 3/2000 | Wolff |
| 6,067,550 A | 5/2000 | Lomet |
| 6,094,708 A | 7/2000 | Hilla et al. |
| 6,098,190 A | 8/2000 | Rust et al. |
| 6,151,607 A | 11/2000 | Lomet |
| 6,192,377 B1 | 2/2001 | Ganesh et al. |
| 6,226,650 B1 | 5/2001 | Mahajan |
| 6,272,500 B1 | 8/2001 | Sugita |
| 6,298,319 B1 | 10/2001 | Heile et al. |
| 6,298,425 B1 | 10/2001 | Whitaker et al. |
| 6,324,661 B1 | 11/2001 | Gerbault et al. |
| 6,353,835 B1 | 3/2002 | Lieuwen |
| 6,393,485 B1 | 5/2002 | Chao et al. |
| 6,438,724 B1 | 8/2002 | Cox et al. |
| 6,446,234 B1 | 9/2002 | Cox et al. |
| 6,449,623 B1 | 9/2002 | Bohannon et al. |
| 6,516,327 B1 | 2/2003 | Zondervan et al. |
| 6,523,032 B1 | 2/2003 | Sunkara |
| 6,535,869 B1 | 3/2003 | Housel, III |
| 6,560,743 B2 | 5/2003 | Plants |
| 6,574,717 B1 | 6/2003 | Ngai et al. |
| 6,691,139 B2 | 2/2004 | Ganesh et al. |
| 6,728,879 B1 | 4/2004 | Atkinson |
| 6,732,125 B1 | 5/2004 | Autrey et al. |
| 6,775,681 B1 | 8/2004 | Ballamkonda |
| 6,804,671 B1 | 10/2004 | Loaiza et al. |
| 6,839,751 B1 | 1/2005 | Dietz et al. |
| 6,886,084 B2 | 4/2005 | Kawashima et al. |
| 6,980,988 B1 | 12/2005 | Demers et al. |
| 6,983,295 B1 | 1/2006 | Hart |
| 7,003,694 B1 | 2/2006 | Anderson, Jr. |
| 7,024,656 B1 | 4/2006 | Ahad |
| 7,076,508 B2 | 7/2006 | Bourbonnais et al. |
| 7,136,970 B2 | 11/2006 | Yoshiya et al. |
| 7,149,769 B2 | 12/2006 | Lubbers et al. |
| 7,149,858 B1 | 12/2006 | Kiselev |
| 7,155,463 B1 | 12/2006 | Wang et al. |
| 7,222,136 B1 | 5/2007 | Brown et al. |
| 7,228,354 B2 | 6/2007 | Chambliss et al. |
| 7,237,027 B1 | 6/2007 | Raccah et al. |
| 7,246,275 B2 | 7/2007 | Therrien et al. |
| 7,257,689 B1 | 8/2007 | Baird |
| 7,287,034 B2 | 10/2007 | Wong et al. |
| 7,290,017 B1 | 10/2007 | Wang et al. |
| 7,363,538 B1 | 4/2008 | Joydip et al. |
| 7,370,068 B1 | 5/2008 | Pham et al. |
| 7,464,113 B1 | 12/2008 | Gikar |
| 7,599,967 B2 | 10/2009 | Girkar et al. |
| 7,600,063 B2 | 10/2009 | Loaiza |
| 7,627,612 B2 | 12/2009 | Ahal et al. |
| 7,627,614 B2 | 12/2009 | Hu et al. |
| 7,636,538 B2 | 12/2009 | Okamoto et al. |
| 7,644,084 B2 | 1/2010 | Rapp |
| 7,734,580 B2 | 6/2010 | Lahiri et al. |
| 7,761,425 B1 | 7/2010 | Erickson et al. |
| 7,822,717 B2 | 10/2010 | Kappor et al. |
| 7,895,216 B2 | 2/2011 | Longshaw et al. |
| 7,966,293 B1 | 6/2011 | Owara et al. |
| 7,996,363 B2 | 8/2011 | Girkar et al. |
| 8,024,396 B2 | 9/2011 | Seddukhin |
| 8,286,182 B2 | 10/2012 | Chan |
| 8,364,648 B1 | 1/2013 | Sim-Tang |
| 8,433,684 B2 | 4/2013 | Munoz |
| 8,468,320 B1 | 6/2013 | Stringham |
| 8,473,953 B2 | 6/2013 | Bourbonnais |
| 8,478,718 B1 | 7/2013 | Ranade |
| 8,560,879 B1 | 10/2013 | Goel |
| 8,615,578 B2 | 12/2013 | Hu et al. |
| 8,694,733 B2 | 4/2014 | Krishnan et al. |
| 8,832,142 B2 | 9/2014 | Marwah et al. |
| 8,838,919 B2 | 9/2014 | Shi et al. |
| 8,856,484 B2 | 10/2014 | Ben-Tsion et al. |
| 8,868,492 B2 | 10/2014 | Garin et al. |
| 8,868,504 B2 | 10/2014 | Aranna et al. |
| 8,930,312 B1 | 1/2015 | Rath |
| 9,026,679 B1 | 5/2015 | Shmuylovich |
| 9,077,579 B1 | 7/2015 | Chu |
| 9,146,934 B2 | 9/2015 | Hu et al. |
| 9,244,996 B2 | 1/2016 | Bourbonnais |
| 9,767,178 B2 | 9/2017 | Srivastava et al. |
| 2002/0049950 A1 | 4/2002 | Loaiza et al. |
| 2002/0091718 A1 | 7/2002 | Bohannon et al. |
| 2002/0112022 A1 | 8/2002 | Kazar et al. |

(56) References Cited

U.S. PATENT DOCUMENTS

| | | |
|---|---|---|
| 2002/0133508 A1 | 9/2002 | LaRue et al. |
| 2002/0143755 A1 | 10/2002 | Wynblatt et al. |
| 2002/0165724 A1 | 11/2002 | Blankesteijn |
| 2003/0046396 A1 | 3/2003 | Richter et al. |
| 2003/0061537 A1 | 3/2003 | Cha et al. |
| 2003/0126114 A1 | 7/2003 | Tedesco |
| 2003/0140050 A1* | 7/2003 | Li .................. G06F 16/50 |
| 2003/0140288 A1 | 7/2003 | Loaiza et al. |
| 2003/0212660 A1 | 11/2003 | Kerwin |
| 2003/0217064 A1 | 11/2003 | Walters |
| 2003/0217071 A1 | 11/2003 | Kobayashi et al. |
| 2004/0003087 A1 | 1/2004 | Chambliss et al. |
| 2004/0062106 A1 | 4/2004 | Ramesh et al. |
| 2004/0193570 A1 | 9/2004 | Yaegar |
| 2004/0267809 A1 | 12/2004 | East et al. |
| 2005/0005083 A1 | 1/2005 | Ozdemir |
| 2005/0038831 A1 | 2/2005 | Souder et al. |
| 2005/0055380 A1 | 3/2005 | Thompson et al. |
| 2005/0120025 A1 | 6/2005 | Rodriguez et al. |
| 2005/0165798 A1 | 7/2005 | Cherkauer et al. |
| 2006/0004691 A1 | 1/2006 | Sifry |
| 2006/0015542 A1 | 1/2006 | Pommerenk |
| 2006/0047713 A1 | 3/2006 | Gornshtein |
| 2006/0064405 A1 | 3/2006 | Jiang et al. |
| 2006/0080646 A1 | 4/2006 | Aman |
| 2006/0129595 A1 | 6/2006 | Sankaran |
| 2006/0168585 A1 | 7/2006 | Grcevski |
| 2006/0173833 A1 | 8/2006 | Purcell et al. |
| 2006/0179867 A1 | 8/2006 | Ha et al. |
| 2006/0200497 A1 | 9/2006 | Hu et al. |
| 2006/0212481 A1 | 9/2006 | Stacey et al. |
| 2006/0212573 A1 | 9/2006 | Loaiza |
| 2006/0224551 A1 | 10/2006 | Lariba-Pey |
| 2006/0242513 A1 | 10/2006 | Loaiza et al. |
| 2007/0038689 A1 | 2/2007 | Shinkai |
| 2007/0083505 A1 | 4/2007 | Ferrari et al. |
| 2007/0100912 A1 | 5/2007 | Pareek et al. |
| 2007/0156957 A1 | 7/2007 | MacHardy et al. |
| 2007/0174292 A1 | 7/2007 | Li et al. |
| 2007/0226277 A1 | 9/2007 | Holenstein et al. |
| 2007/0239680 A1 | 10/2007 | Oztekin et al. |
| 2007/0244918 A1 | 10/2007 | Lee et al. |
| 2008/0005112 A1 | 1/2008 | Shavit |
| 2008/0016074 A1 | 1/2008 | Ben-dyke et al. |
| 2008/0059492 A1 | 3/2008 | Tarin |
| 2008/0104283 A1 | 5/2008 | Shin et al. |
| 2008/0126846 A1 | 5/2008 | Vivian et al. |
| 2008/0147599 A1 | 6/2008 | Young-Lai |
| 2008/0162587 A1* | 7/2008 | Auer .................. G06F 8/60 |
| 2008/0177803 A1 | 7/2008 | Fineberg et al. |
| 2008/0208820 A1 | 8/2008 | Usey |
| 2008/0222311 A1 | 9/2008 | Lee |
| 2008/0228835 A1 | 9/2008 | Lashley et al. |
| 2008/0244209 A1 | 10/2008 | Seelam et al. |
| 2008/0256143 A1 | 10/2008 | Reddy et al. |
| 2008/0256250 A1 | 10/2008 | Wakefield et al. |
| 2008/0281784 A1 | 11/2008 | Zane et al. |
| 2008/0281865 A1 | 11/2008 | Price et al. |
| 2009/0024384 A1 | 1/2009 | Kobayashi et al. |
| 2009/0034377 A1 | 2/2009 | English et al. |
| 2009/0063591 A1 | 3/2009 | Betten et al. |
| 2009/0119295 A1 | 5/2009 | Chou et al. |
| 2009/0182746 A1 | 7/2009 | Mittal et al. |
| 2009/0248756 A1 | 10/2009 | Akidau |
| 2009/0268903 A1 | 10/2009 | Bojinov et al. |
| 2009/0282203 A1 | 11/2009 | Haustein |
| 2009/0307290 A1 | 12/2009 | Barsness et al. |
| 2010/0036843 A1 | 2/2010 | MacNaughton et al. |
| 2010/0082646 A1 | 4/2010 | Meek et al. |
| 2010/0082648 A1 | 4/2010 | Potapov |
| 2010/0122026 A1 | 5/2010 | Umaamageswaran et al. |
| 2010/0145909 A1 | 6/2010 | Ngo |
| 2010/0211577 A1 | 8/2010 | Shimuzu et al. |
| 2010/0235335 A1 | 9/2010 | Heman et al. |
| 2010/0250549 A1 | 9/2010 | Muller et al. |
| 2010/0318495 A1 | 12/2010 | Yan et al. |
| 2010/0318570 A1 | 12/2010 | Narasinghanallur et al. |
| 2011/0004586 A1 | 1/2011 | Cherryholmes et al. |
| 2011/0029569 A1 | 2/2011 | Ganesh et al. |
| 2011/0060724 A1 | 3/2011 | Chan |
| 2011/0066791 A1 | 3/2011 | Goyal et al. |
| 2011/0087633 A1 | 4/2011 | Kreuder et al. |
| 2011/0087637 A1 | 4/2011 | Sundaram et al. |
| 2011/0099179 A1 | 4/2011 | Balebail |
| 2011/0138123 A1 | 6/2011 | Aditya et al. |
| 2011/0145207 A1 | 6/2011 | Agrawal et al. |
| 2011/0231362 A1 | 9/2011 | Attarde et al. |
| 2011/0238655 A1 | 9/2011 | Clorain et al. |
| 2011/0307450 A1 | 12/2011 | Hahn et al. |
| 2012/0054158 A1 | 3/2012 | Hu et al. |
| 2012/0054533 A1 | 3/2012 | Shi et al. |
| 2012/0054546 A1 | 3/2012 | Kampouris |
| 2012/0109926 A1 | 5/2012 | Novik et al. |
| 2012/0173515 A1 | 7/2012 | Jeong et al. |
| 2012/0259809 A1 | 10/2012 | Hermann |
| 2012/0278282 A1 | 11/2012 | Lu |
| 2012/0284228 A1 | 11/2012 | Ghosh |
| 2012/0323849 A1 | 12/2012 | Garin et al. |
| 2012/0323971 A1 | 12/2012 | Pasupuleti |
| 2013/0085742 A1 | 4/2013 | Baker et al. |
| 2013/0117237 A1 | 5/2013 | Thomsen et al. |
| 2013/0132674 A1 | 5/2013 | Sundrani |
| 2013/0198133 A1 | 8/2013 | Lee |
| 2013/0212068 A1 | 8/2013 | Talius et al. |
| 2014/0040218 A1 | 2/2014 | Kimura et al. |
| 2014/0059020 A1 | 2/2014 | Hu et al. |
| 2014/0075493 A1 | 3/2014 | Krishnan et al. |
| 2014/0095452 A1* | 4/2014 | Lee .................. G06F 11/1471 |
| | | 707/683 |
| 2014/0095530 A1 | 4/2014 | Lee et al. |
| 2014/0095546 A1 | 4/2014 | Kruglikov et al. |
| 2014/0164331 A1* | 6/2014 | Li .................. G06F 11/1471 |
| | | 707/648 |
| 2014/0258241 A1 | 9/2014 | Chen |
| 2014/0279840 A1 | 9/2014 | Chan et al. |
| 2015/0032694 A1 | 1/2015 | Rajamani et al. |
| 2015/0088811 A1 | 3/2015 | Hase et al. |
| 2015/0088822 A1 | 3/2015 | Raja |
| 2015/0088824 A1 | 3/2015 | Kamp et al. |
| 2015/0088830 A1 | 3/2015 | Kamp |
| 2015/0088926 A1 | 3/2015 | Chavan et al. |
| 2015/0089125 A1 | 3/2015 | Mukherjee et al. |
| 2015/0089134 A1 | 3/2015 | Mukherjee et al. |
| 2015/0120659 A1 | 4/2015 | Srivastava et al. |
| 2015/0120780 A1* | 4/2015 | Jain .................. G06F 21/6227 |
| | | 707/783 |
| 2015/0254240 A1* | 9/2015 | Li .................. G06F 16/214 |
| | | 707/703 |
| 2015/0317183 A1 | 11/2015 | Little |
| 2016/0179867 A1 | 6/2016 | Li et al. |
| 2016/0292167 A1 | 10/2016 | Tran et al. |
| 2017/0116252 A1 | 4/2017 | Krishnaswamy |
| 2017/0116298 A1 | 4/2017 | Ravipati |
| 2018/0074915 A1 | 3/2018 | Yang |
| 2018/0165324 A1 | 6/2018 | Krishnaswamy |
| 2018/0349458 A1 | 12/2018 | Guirguis |

FOREIGN PATENT DOCUMENTS

| | | |
|---|---|---|
| EP | 2 608 070 A1 | 6/2013 |
| GB | 1 332 631 A | 10/1973 |
| GB | 2505 185 A | 2/2014 |
| JP | 59-081940 | 5/1984 |
| JP | 02-189663 | 7/1990 |
| JP | 08-235032 | 9/1996 |
| JP | 10-040122 | 2/1998 |
| JP | 10-240575 | 9/1998 |
| WO | WO 2007/078444 A1 | 7/2007 |

OTHER PUBLICATIONS

U.S. Appl. No. 13/631,815, filed Sep. 28, 2012, Office Action, dated Nov. 6, 2014.

(56) References Cited

OTHER PUBLICATIONS

U.S. Appl. No. 13/631,815, filed Sep. 28, 2012, Notice of Allowance, dated Aug. 20, 2015.
U.S. Appl. No. 13/631,815, filed Sep. 8, 2012, Notice of Allowance, dated Apr. 3, 2015.
U.S. Appl. No. 13/631,815, filed Sep. 28, 2012, Office Action, dated Dec. 23, 2013.
U.S. Appl. No. 13/631,815, filed Sep. 28, 2012, Office Action, dated May 29, 2014.
Ravipati, U.S. Appl. No. 15/215,443, filed Jul. 20, 2016, Office Action, dated Sep. 19, 2018.
U.S. Appl. No. 14/578,093, filed Mar. 8, 2017, Office Action, dated Mar. 8, 2017.
Oracle, "Oracle Data Guard", Concepts and Administration 12c Release 1 (12.1), dated Nov. 2015, 50 pages.
Oracle, "Oracle Active Data Guard", Real-Time Protection and Availability, Oracle White Paper, dated Oct. 2015, 22 pages.
Oracle, "Maximum Availability Architecture", Oracle Best Practices for High Availability, dated Sep. 2011, 42 pages.
Teschke, et al., "Concurrent Warehouse Maintenance Without Comprising Session Consistency", 1998, 10 pages.
Vassilakis et al., "Implementation of Transaction and Concurrency Control Support in a Temporal DBMS" Information Systems, vol. 23, No. 5, 1998, 16 pages.
Bober et al., "On Mixing Queries and Transactions via Multiversion Locking", IEEE, 1992, 11 pages.
Mohan et al., "Efficient and Flexible Methods for Transient Versioning of Records to Avoid Locking by Reading-Only Transactions", XP000393583, IBM Almaden Research Center, Dated Feb. 6, 1992, 11 pages.
Zhe, Li, et al., "PERF join: an alternative to two-way semijoin and Bloomjoin" Proceedings of the 1995 ACM, New York. NY, US., 1995, pp. 187-144.
Shao et al., "Clotho: Decoupling Memory Page Layout from Storage Organization", Proceedings of the 30th VLDB Conference, Toronto, Canada, 2004, 12 pages.
Schaffner et al., "A Hybrid Row-Column OLTP Database Architecture for Operational Reporting", dated Aug. 24, 2008, 14 pages.
Ramamurthy, Ravishankar, "A Case for Fractured Mirrors" Proceedings of the 28th VLDB Conference, dated, 2002, 12 pages.
Phipps, Colin:, "Mapping Deflated Files", Internet Article, dated Jan. 6, 2013, http://zsync.moria.org.uk/paper/ch03s02.html, 3 pages.
Oracle Database Administrator's Guide, 11g Release 2 (11.2), Chapter 26, Feb. 2010, 54 pages. http://download.oracle.com/docs/cd/E11882_01/server.112/e10595.pdf.
Oracle Database Administrator's Guide, 10g Release 2 (10.2), Chapter 24, May 2006, 34 pages. http://download.oracle.com/docs/cd/B19306_01/server.102/b14231.pdf.
O'Neil, P., et al., "Multi-table joins through bitmapped join indices", SIGMOD Record, ACM, New York, NY, US, vol. 24, No. 3, Sep. 1, 1995, pp. 8-11, ISSN: 0163-5808.
Nirmesh, Malviya, "Recovery Algorithms for In-Memory OLTP Databases", Master of Science Thesis, dated Jul. 1, 2012, 66 pages.
Loizos, M., et al., "Improving distributed join efficiency with extended bloom filter operations", Advanced Networking and Applications, 2007. AINA '07., 21st international Conf. IEEE, May 1, 2007.
Mackert, F. Lothar et al., "R* optimizer validation and performance evaluation for local queries" SIGMOD Record, ACM, New York, NY, US., vol. 15, No. 2, Jun. 1, 1986, pp. 84-95, ISSN: 0163-5808.
IBM, "A Scheduling Algorithm for Processing Mutually Exclusive Workloads in a Multi-System Configuration", dated Aug. 19, 2002, IEEE, 3 pages.
Zhang Ho et al., "In-Memory Big Data Management and Processing: A Survery", IEEE Transactions on Knowledge and Data Engineering, vol. 27, No. 7, dated Jul. 31, 2015, 30 pages.
Vishal Sikka et al., "Efficient Transaction Processing in SAP Hana Database", Proceedings of the 2012, International Conference on Management of Data, dated Jan. 31, 2012, 12 pages.

Farber et al., "SAP HANA Database—Data Management for Modern Business Applications", SIGMOD Record, dated Dec. 2011, vol. 40, No. 4, 8 pages.
Khalid Sayood:, "Introduction to data Compression", Morgan Kaufmann Publisher, dated Dec. 1996, 4 pages.
Antoni Cau, et al., "Specifying Fault Tolerance within Stark's Formalism," 1993, IEEE, pp. 392-401.
IBM Corp., "IBM OS/2 Extended Edition Configuration," Feb. 1990, IBM Technical Disclosure Bulletin, vol. 32, No. 9B, pp. 446-451.
Alapati, S., Backing Up Databases. In: Expert Oracle Database 11g Administration, Apress, dated 2009, pp. 1-70.
Yang, U.S. Appl. No. 15/266,375, filed Sep. 15, 2016, Interview Summary, dated Feb. 14, 2019.
Ravipati, U.S. Appl. No. 15/215,443, filed Jul. 20, 2016, Final Office Action, dated Mar. 11, 2019.
Rajeev Kumar et al., Oracle DBA, A Helping Hand, Container Database and Pluggable Database (CDB & PDB), retrieved from the internet on Dec. 4, 2013, 2 pages.
Preimesberger, Chris, "Oracle Profits Up, but Revenues Slip" Oracle, dated Sep. 20, 2012, 2 pages.
Oracle Help Center , "Database 2 Day + Data Replication and Integration Guide", 3 Accessing and Modifying Information in Multiple Databases, dated 2016, 14 pages.
Oracle Base, Multitenant: Create and Configure a Pluggable Database (PDB) In Oracle Database 12c Release 1 (12.1), dated Jan. 8, 2014, 16 pages.
Muhammad Anwar, "How to Install Oracle 12c Multitenant Pluggable Database", Dated Feb. 24, 2012, 27 pages.
Garcia-Molina et al., "Database System Implementation", dated Jan. 1, 2000, 84 pages.
Francisco Munoz et al., "Oracle Database 12c Backup and Recovery Survival Guide", dated Sep. 24, 2013, 8 pages.
Dominic Betts et al., "Developing Multi-Tenant Applications for the Cloud", 3rd Edition, Microsoft, 2012, 246 pages.
Das et al., "Albatross: Lightweight Elasticity in Shared Storage Databases for the Cloud Using Live Data Migration", Proceedings of the VLDB Endowment, vol. 4 No. 8 Copyright, dated 2011, 12 pages.
Anonymous: "Oracle-Base—Multitenant: Overview of Container Databases (CDB) and Pluggable Databases (PDB)", dated Mar. 3, 2014, 4 pages.
Anonymous, :An Oracle White Paper Oracle Database Appliance: Migration Strategies, dated Jun. 2012, 14 pages.
Chan, U.S. Appl. No. 13/829,103, filed Mar. 14, 2013, Notice of Allowance, dated Aug. 1, 2018.
Yang, U.S. Appl. No. 15/266,375, filed Sep. 15, 2016, Office Action, dated Nov. 29, 2018.
Ravipati, U.S. Appl. No. 15/215,443, filed Jul. 20, 2016, Interview Summary, dated Jan. 4, 2019.
Yang, U.S. Appl. No. 15/266,375, filed Sep. 15, 2016, Notice of Allowance, dated Apr. 11, 2019.
Ravipati, U.S. Appl. No. 15/215,443, filed Jul. 20, 2016, Advisory Action, dated Jun. 5, 2019.
Ravipati, U.S. Appl. No. 15/215,443, filed Jul. 20, 2016, Office Action, dated Jul. 18, 2019.
Yang, U.S. Appl. No. 15,266,375, filed Sep. 15, 2016, Office Action, dated Oct. 31, 2019.
Srivastava, U.S. Appl. No. 15/482,225, filed Apr. 7, 2017, Office Action, dated Sep. 3, 2019.
Krishnaswamy, U.S. Appl. No. 15/892,677, filed Feb. 9, 2018, Office Action, dated Oct. 17, 2019.
Guirguis, U.S. Appl. No. 15/610,171, filed May 31, 2017, Office Action, dated Sep. 12, 2019.
Krishnaswamy, U.S. Appl. No. 15/892,677, filed Feb. 9, 2018, Notice of Allowance, dated Mar. 11, 2020.
Guirguis, U.S. Appl. No. 15/610,171, fFiled May 31, 2017, Notice of Allowance, dated Feb. 20, 2020.
Srivastava, U.S. Appl. No. 15/482,225, filed Apr. 7, 2017, Notice of Allowance, dated Dec. 20, 2019.
Ravipati, U.S. Appl. No. 15/215,443, filed Jul. 20, 2016, Final Office Action, dated Dec. 4, 2019.

(56) References Cited

OTHER PUBLICATIONS

Werner Vogels, "Eventually Consistent", CACM, dated Dec. 19, 2007, 4 pages.
V Sikka et al, Efficient Transaction Processing in SAP HANA Database: the End of a Column Store Myth, SIGMOD dated 2012, 11 pages.
Oracle® Flashback Technologies, http://www.oracle.com/technetwork/database/features/availability/flashback-overview-082751.html, last viewed on Dec. 5, 2019, 3 pages.
Oracle® TimesTen In-Memory Database and TimesTen Application-Tier Database Cache, www.oracle.com/technetwork/database/database-technologies/timesten/overview/index.html, viewed on Dec. 5, 2019, 1pg.
Oracle Help Center, Oracle® TimesTen Application-Tier Database Cache User's Guide: Read-only Cache Groups, http://stdoc.us.oracle.com/12/12102/TTCAC/define.htm#TTCAC211, viewed on Dec. 5, 2019, 10 pages.
Ma et al., On benchmarking online social media analytical queries. In First International Workshop on Graph Data Management Experiences and Systems (GRADES '13). ACM, Article, dated 2013, 7 pages.
Labrinidis et al., "Balancing Performance and Data Freshness in Web Database Servers", VLDB dated 2003, 12 pages.
Jeff Erickson, In-Memory Acceleration for the Real-Time Enterprise,http://www.oracle.com/us/corporate/features/database-in-memory-option/index.html, last viewed on Dec. 5, 2019, 4 pages.
Gary Marchionini, Exploratory Search: From Finding to Understanding. Communications. ACM 49, 4, dated Apr. 2006, pp. 41-46.
Oracle, "Oracle® TimesTen Application—Tier Database Cache", Users Guide, Release 18.1, Dated Nov. 2019, 230 pages.
Oracle Help Center, "TimesTen Application—Tier Database Cache Introduction", dated 2012, 10 pages.

\* cited by examiner

302
PERFORM A REFRESH OPERATION ON A CLONED PLUGGABLE DATABASE BASED, AT LEAST IN PART, ON REDO ENTRIES RECORDED FOR A SOURCE PLUGGABLE DATABASE

304
WHILE PERFORMING THE REFRESH OPERATION ON THE CLONED PLUGGABLE DATABASE, RECEIVE A QUERY OVER THE CLONED PLUGGABLE DATABASE

306
DETERMINE A LOGICAL TIMESTAMP (LT) FOR THE QUERY BASED ON A FIRST LT SERVICE THAT IS MAINTAINED FOR THE CLONED PLUGGABLE DATABASE; WHEREIN THE FIRST LT SERVICE MAINTAINED FOR THE CLONED PLUGGABLE DATABASE IS DISTINCT FROM A SECOND LT SERVICE THAT IS MAINTAINED FOR A CONTAINER DATABASE THAT CONTAINS THE CLONED PLUGGABLE DATABASE

308
EXECUTE THE QUERY OVER THE CLONED PLUGGABLE DATABASE BASED, AT LEAST IN PART, ON THE LT FOR THE QUERY

502
EXECUTE A FIRST QUERY OVER A READ-ONLY PLUGGABLE DATABASE IN A STANDBY CONTAINER DATABASE THAT REPLICATES DATA FROM A PRIMARY CONTAINER DATABASE; WHEREIN THE FIRST QUERY REQUIRES A WRITE OPERATION

504
AUTOMATICALLY GENERATE A SECOND OPERATION THAT PERFORMS THE WRITE OPERATION IN A PRIVATE PLUGGABLE DATABASE IN THE STANDBY CONTAINER DATABASE

506
DETERMINE A LOGICAL TIMESTAMP (LT) FOR THE SECOND OPERATION BASED ON A FIRST LT SERVICE MAINTAINED FOR THE PRIVATE PLUGGABLE DATABASE; WHEREIN THE FIRST LT SERVICE MAINTAINED FOR THE PRIVATE PLUGGABLE DATABASE IS DISTINCT FROM A SECOND LT SERVICE MAINTAINED FOR THE STANDBY CONTAINER DATABASE

508
EXECUTE THE SECOND OPERATION BASED, AT LEAST IN PART, ON THE LT DETERMINED FOR THE SECOND OPERATION

FACILITATING OPERATIONS ON PLUGGABLE DATABASES USING SEPARATE LOGICAL TIMESTAMP SERVICES

CROSS-REFERENCE TO RELATED APPLICATIONS

This application is related to the following applications/patents, each of which is incorporated by reference as if fully set forth herein:
 U.S. Pat. No. 9,239,763, filed Sep. 28, 2012, issued Jan. 19, 2016, titled "Container Database";
 U.S. Pat. No. 7,734,580, filed Jan. 29, 2007, issued Jun. 8, 2010, titled "Readable Physical Storage Replica And Standby Database System", referred to herein as the "Readable Physical Storage Replica Application"; and
 application Ser. No. 15/215,443, filed Jul. 20, 2016, titled "Techniques For Keeping A Copy Of A Pluggable Database Up To Date With A Source Pluggable Database In Read-Write Mode", referred to herein as the "Refreshable PDB Application".

FIELD OF THE INVENTION

The present invention relates to querying pluggable databases, and, more specifically, to utilizing pluggable database-specific system change number services (a) to facilitate up-to-date querying of a refreshable cloned pluggable database, and (b) to allow performance of write operations in a private read-write pluggable database within a physical standby container database system.

BACKGROUND

Database consolidation involves distributing and sharing computing resources among multiple databases. Databases may be consolidated using a container database management system. A consolidated database, such as a multitenant container database (CDB), includes one or more pluggable databases (PDBs).

A container database includes a data dictionary, which comprises metadata that defines database objects in the container database. For example, the data dictionary for a given CDB will include metadata describing each PDB that is contained in the given CDB, including the database object included in each PDB. Further, each pluggable database includes a PDB-specific database dictionary that comprises metadata that defines database objects contained in the pluggable database.

Database objects include tables, table columns, files, tablespaces, data types, users, user privileges, and storage structures used for storing database object data. A tablespace comprises a set of one or more files that are used to store the data for various types of database objects, such as a table. If a database object is stored in a tablespace of a particular PDB, the data dictionary stored in the particular PDB maps the database object to the tablespace that holds the data for the database object.

Pluggable databases may be "plugged in" to a container database, and may be transported between database servers and/or database management systems (DBMSs). The container database may manage multiple pluggable databases and a given database server instance may serve those pluggable databases from the container database. As such, a given container database allows multiple pluggable databases to run on the same database server and/or database server instance, allowing the computing resources of a single database server or instance to be shared between multiple pluggable databases. In a container database management system, each pluggable database may be opened or closed in the container database independently from other pluggable databases.

An application may access a pluggable database by establishing a database session on the container database management system for that pluggable database, where a database session represents the connection between an application and the container database management system for accessing the pluggable database. A database session is initiated for a pluggable database by, for example, transmitting a request for a new connection to the container database management system, the request specifying the pluggable database. In response to such a request, the container database management system establishes the requested database session. A container database management system may host multiple database sessions, each database session being for one of multiple pluggable databases.

A user may create a clone of a source PDB, where the clone represents a copy of the source PDB. A cloned PDB may be configured to be refreshed, where a refresh operation on the cloned PDB incorporates changes, made to the source PDB, into the cloned PDB. However, while a refreshable PDB clone is being refreshed, the access to data within the PDB clone is limited because no portion of the updated data is available for querying until the refresh operation stops. In the case where a PDB clone is closed to all operations during refresh, the refreshable PDB clone is generally refreshed only periodically in order to balance availability of data and freshness of data in the PDB clone. Thus, it is possible, and even probable, that any query performed on a refreshable PDB clone will return result data that lags behind the data in the source PDB.

It would be beneficial to allow greater access to data within a refreshable cloned PDB while the PDB clone is undergoing a refresh operation, which would increase the availability of the most up-to-date data from the PDB source.

Furthermore, in the context of DBMS replication, a container database is either entirely a primary container database or is entirely a standby container database acting as a physical standby of a source container database. In a primary container database, the root database is opened in read-write mode and, subsequently, any pluggable database established in the primary container database may be opened in read-write mode. The system change number of a primary container database is advanced for changes made within the container database. Thus, even if no changes are being made to a given PDB within a primary container database, a logical timestamp, such as the system change number (SCN), being used for the PDB is still being advanced based on changes being made to other data within the primary container database.

In a standby container database acting as a physical standby of a source container database, the root database is opened in standby mode and, subsequently, all pluggable databases established in the standby container database are replicas that may only be opened in read-only mode. A standby container database replicates changes, made to data blocks of the source primary container database, to replicas of the data blocks located within the standby container database. (See, e.g., Oracle Active Data Guard ("ADG"), described in "Oracle Active Data Guard: Real-Time Data Protection and Availability", An Oracle White Paper, October 2015, the entire contents of which are incorporated by reference as if fully set forth herein.)

The standby container database maintains a latest-readable query time that indicates a time (relative to the source primary container database) at which all dependent changes to the primary container database have been fully applied in the standby container database. Queries computed over data in the standby container database are run using the query time maintained by the standby container database, which ensures that the queries return data that is consistent with transactions committed on the source primary container database.

Because a standby container database only replicates data from a source primary database, and all of the standby PDBs in a standby container database are opened in read-only mode, no data can be written to a standby container database. Thus, any query run over a standby container database can perform only read operations, and cannot do any write operations, even if those write operations are for temporary, intermediate, purposes and do not logically edit replicated data in the standby container database.

To facilitate queries that require write operations, a user may link a database with read-write capabilities to the standby container database and perform write operations in the linked database. However, working over a database link between separate databases requires administrator effort to set up the database link. Also, retrieving information via a database link between distinct databases (i.e., over a network) is not as efficient as performing all needed functions for a query within a single container database.

As such, it would be beneficial to accommodate write operations within a standby container database system without requiring establishing a link over a network with a separate database.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3 depicts a flowchart for performing read operations on an active refreshable PDB clone while the PDB clone is undergoing a refresh operation.

FIG. 5 depicts a flowchart for utilizing a private read-write PDB in a standby CDB to accommodate a write operation required by a query over data in the standby CDB.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A refreshable pluggable database clone is associated with a PDB-specific logical timestamp (LT) service that automatically and continuously reflects the LT of the most recent changes that have fully committed within the PDB clone during a refresh operation. This PDB-specific LT service is distinct from a shared LT service that provides LTs for changes within the CDB, that contains the refreshable PDB clone, occurring in databases that are not associated with a PDB-specific LT service.

Since the current LT, maintained by a PDB-specific LT service that is associated with a refreshable PDB clone, continuously reflects the LT of the most recent changes that have fully committed within the PDB clone, the PDB-specific LT service may be used to perform queries over the changing data in the PDB clone. This utilization of a PDB-specific LT service allows a refreshable PDB clone to remain open while the PDB clone is undergoing a refresh operation, which increases access to the most up-to-date data in the PDB clone.

Furthermore, another kind of PDB-specific LT service can be utilized to facilitate write operations in a standby container database, where the standby container database is a physical standby of a primary (or source) container database. Specifically, a standby CDB is configured with a private read-write PDB that does not replicate data from the source CDB. This private read-write PDB may accommodate a write operation required by a query over data in the standby CDB.

A PDB-specific LT service provides LTs for such a private PDB, where the PDB-specific LT service provides LTs for use in ordering changes made within the private PDB. This PDB-specific LT service is distinct from the LT service for the standby system, which tracks a query LT that is the LT from the source CDB at which all dependent changes have been fully applied within the standby CDB. Thus, the PDB-specific LT service facilitates maintenance of ACID properties for database transactions running within the private PDB.

Architecture for Pluggable Database-Specific System Change Numbers

Figure 1:
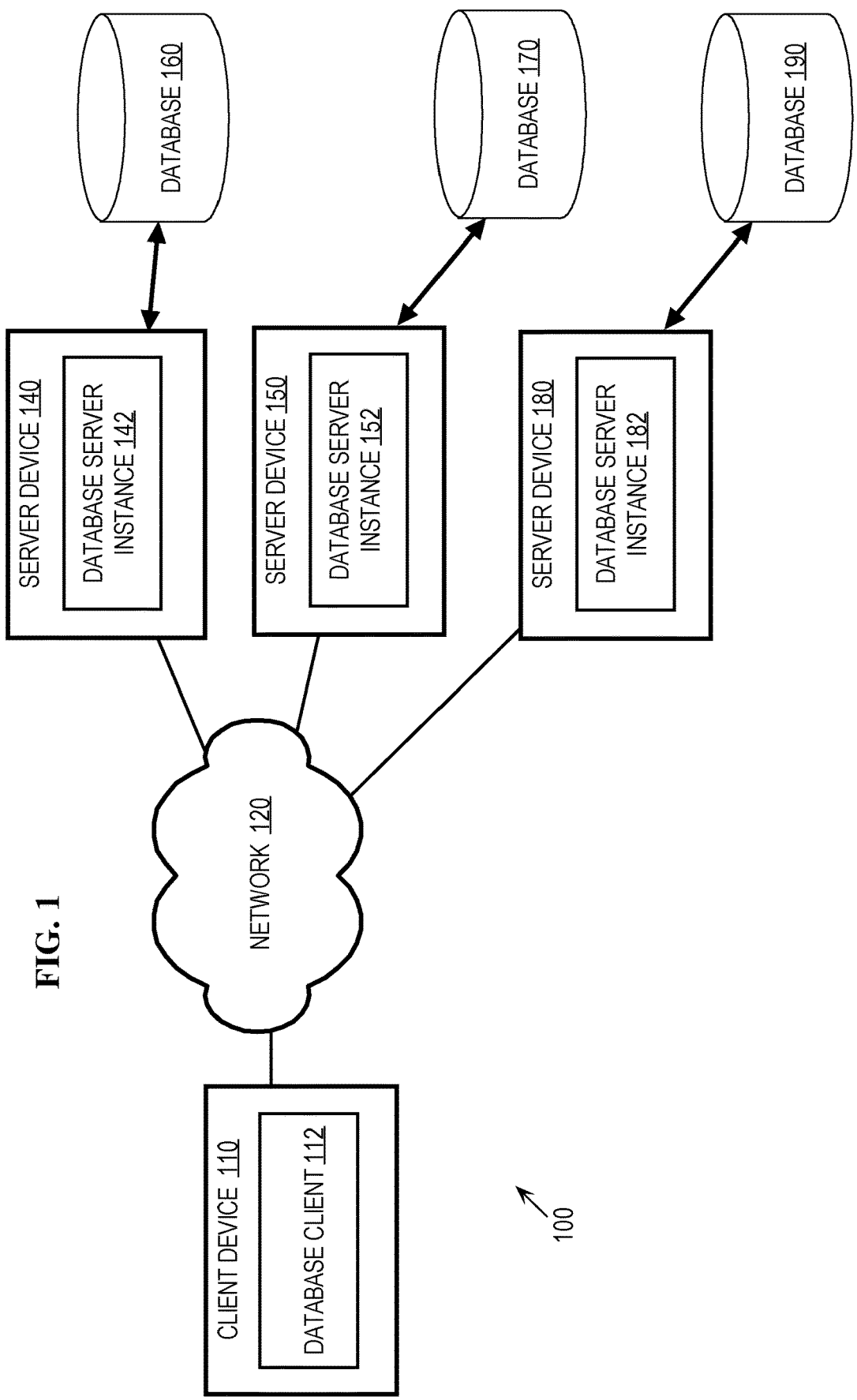
FIG. 1 is a block diagram that depicts an example network arrangement for maintaining PDB-specific system change number services.

FIG. 1 is a block diagram that depicts an example network arrangement for maintaining PDB-specific system change number services, according to embodiments. Network arrangement 100 includes a client device 110 and server devices 140, 150, and 180 communicatively coupled via a network 120. Example network arrangement 100 may include other devices, including client devices, server devices, storage devices, and display devices, according to embodiments.

Client device 110 may be implemented by any type of computing device that is communicatively connected to network 120. Example implementations of client device 110 include, without limitation, workstations, personal computers, laptop computers, personal digital assistants (PDAs), tablet computers, cellular telephony devices such as smart phones, and any other type of computing device.

In network arrangement 100, client device 110 is configured with a database client 112. Database client 112 may be implemented in any number of ways, including as a stand-alone application running on client device 110, or as a plugin to a browser running at client device 110, etc. Database client 112 may be implemented by one or more logical modules. Client device 110 may be configured with other mechanisms, processes and functionalities, depending upon a particular implementation.

Network 120 may be implemented with any type of medium and/or mechanism that facilitates the exchange of information between client device 110 and any of server devices 140, 150, and 180. Furthermore, network 120 may facilitate use of any type of communications protocol, and may be secured or unsecured, depending upon the requirements of a particular embodiment.

According to embodiments, one or more of server devices 140, 150, and 180 each implement a single-server database management system (DBMS). According to embodiments, one or more of server devices 140, 150, and 180 are nodes in one or more clusters of nodes managed by multi-node DBMSs, e.g., shared-everything cluster database environments (such as Oracle Real Application Clusters ("RAC")). (See "Oracle Real Application Clusters (RAC)", An Oracle White Paper, June 2013, Oracle Database 12C documentation. This document is incorporated by reference as if fully set forth herein.) According to embodiments, any number of nodes may be part of a node cluster managed by a multi-node DBMS. Specifically, resources from multiple nodes in a multi-node database system can be allocated to run a particular database server's software.

Server devices 140, 150, and 180 are implemented by any type of computing device that is capable of communicating with client device 110 over network 120 and also capable of running a database server instance. In network arrangement 100, server devices 140, 150, and 180 are configured with database server instances 142, 152, and 182, respectively.

A database server instance (or "instance") is a server that comprises a combination of the software and allocation of resources from a node. Specifically, a server, such as a database server, is a combination of integrated software components and an allocation of computational resources, such as memory, a node (i.e., a computing device), and/or processes on the node for executing the integrated software components on a processor, the combination of the software and computational resources being dedicated to performing a particular function on behalf of one or more clients (such as database client 112 on client device 110).

Database server instance 142 on server device 140 maintains access to and manages data in database 160. Database server instance 152 on server device 150 maintains access to and manages data in database 170. Further, database server instance 182 on server device 180 maintains access to and manages data in database 190. According to an embodiment, access to a given database comprises access to (a) a set of disk drives storing data for the database, and (b) data blocks stored thereon. Databases 160, 170, and 190 may variously reside in any type of storage, including volatile and non-volatile storage, e.g., random access memory (RAM), one or more hard disks, main memory, etc.

One or more of the functions attributed to processes running on server device 140, 150, and/or 180, as described herein, may be performed by services on other server devices that are communicatively coupled to network 120. Furthermore, any of the functionality attributed to database client 112 and database server instances 142, 152, and 182 herein may be performed by any other logical entity of network arrangement 100, according to embodiments. Also, database server instances 142, 152, and 182 may each be implemented by one or more logical modules, and are described in further detail below. Server devices 140, 150, and 180 may be configured variously with other mechanisms, processes and functionalities, depending upon a particular implementation.

In an embodiment, each of the processes and/or functionality described in connection with database client 112, database server instances 142, 152, and 182, and/or databases 160, 170, and 190 are performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Database Systems

Embodiments of the present invention are used in the context of database management systems (DBMSs). Therefore, a description of a DBMS is useful. A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users may interact with an instance of a database server of a DBMS by submitting, to the database server instance, commands that cause the database server instance to perform operations on data stored in a database. For example, a user at client device 110 submits, via database client 112, a database command to database server instance 142 with which database client 112 maintains a connection. A user may be one or more applications running on client device 110 that cause database client 112 to interact with database server instance 142. Multiple parties may access database resources through a given application. Multiple parties and/or users may also be referred to herein, collectively, as a user.

Container Database and Pluggable Database Architecture

Figure 2:
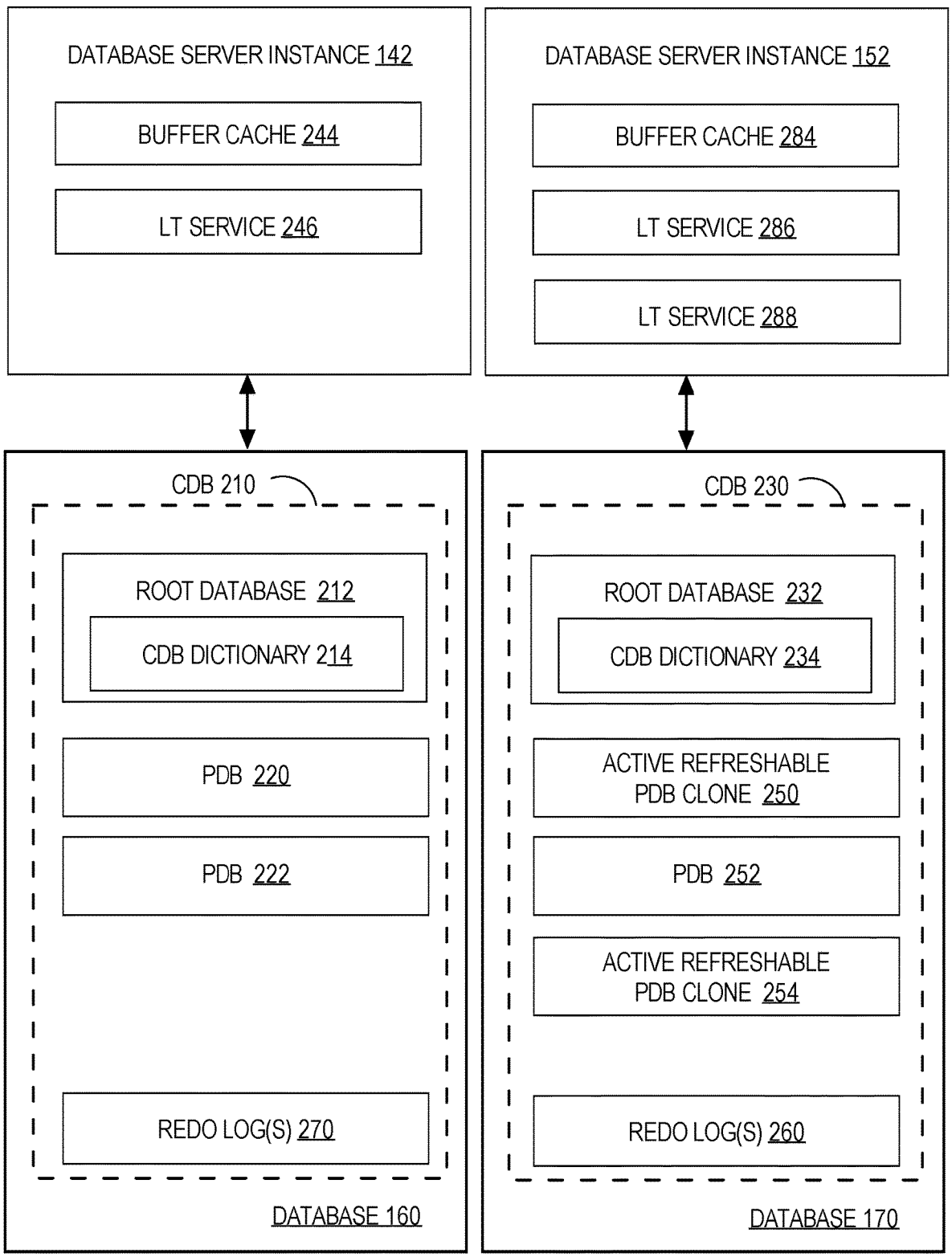
FIG. 2 depicts an example resource arrangement detailing database server instances and databases.

FIG. 2 depicts an example resource arrangement detailing an embodiment of database server instances 142 and 152 and also of databases 160 and 170. Specifically, in FIG. 2, database 160 includes a root database 212 that represents the data for a CDB 210. CDB 210 is a primary container database that contains PDBs 220 and 222. In FIG. 2, database 170 includes a root database 232 that represents the data for a CDB 230. CDB 230 is a primary database that contains active refreshable PDB clones 250 and 254, and also a PDB 252 (which is not a PDB clone). The depiction of CDBs 210 and 230 are non-limiting; according to embodiments, container databases may include any number of non-refreshable pluggable databases and/or refreshable pluggable databases.

According to embodiments, a PDB clone is a copy of a source PDB. The source PDB of a PDB clone may be located within the same CDB as the PDB clone or may be located in a different CDB than the PDB clone. A refreshable PDB clone is configured to undergo one or more refresh operations after the PDB clone is established. According to embodiments, a refresh operation that refreshes the data in a PDB clone utilizes redo records, recorded for the source PDB, to incorporate (into the PDB clone) changes made to the source PDB that are not yet reflected in the PDB clone. Embodiments of refreshable PDB clones are described in further detail in the Refreshable PDB Application incorporated by reference above.

Primary container databases, such as CDB 210, are configured to contain multiple pluggable databases and provide in-database virtualization for consolidating the multiple separate pluggable databases. For example, root database 212 is a database used to globally manage CDB 210, and to store data required to manage access to PDBs 220 and 222 contained in CDB 210. Although root database 212 is depicted in FIG. 2 as a distinct database object separate from other database objects, any architectural implementation for storing container database data may be used within embodiments.

A root database, such as root database 212, includes a CDB data dictionary, such as CDB dictionary 214. Example CDB 210 also includes redo log(s) 270. Redo logs in a given database include redo information that represents changes that have been made to data in the corresponding database. Each redo entry, in the redo information, that records a change made to a pluggable database includes information identifying the pluggable database in which the change was made, whether the change was committed, and a time at which the change was committed (if applicable). A redo entry may include any kind of information, depending upon particular implementations.

System Change Numbers and Transactions

A DBMS uses an internal logical time stamp to order events that occur within a database, which is necessary to maintain ACID properties of transactions operating within the database. Such an internal time stamp is based on a logical clock. Embodiments are described in the context of a system change number (SCN) system, which is a non-limiting example of a logical clock that produces logical timestamps, i.e., system change numbers. Any type of logical clock and any format of logical timestamp (LT) may be used within embodiments. According to embodiments, an LT may have any format or be associated with a database event in any manner.

As an example of functionality of a logical timestamp, SCNs may occur in a monotonically increasing sequence. A DBMS can use an SCN like a clock because an observed SCN indicates a logical point in time, and repeated observations (where an observation is a request for an SCN from an SCN service) return equal or greater values. If a first event is associated with a lower SCN, than an SCN associated with another event, then the first event occurred at an earlier time with respect to the database. Several events may share the same SCN, which means that the several events occurred at the same time with respect to the database. For example, events that are part of a committed transaction are all associated with the same commit SCN.

A transaction is a logical, atomic unit of work that contains one or more database operations. A transaction groups database operations so that they are either all committed, which means that changes resulting from the operations are applied to the database, or all rolled back, which means that changes resulting from the operations are undone from the database. When a transaction commits, the transaction is associated with a commit LT. The transaction is considered as atomically committed as of the commit LT.

As transactions are committed by a database system, the database system transitions from one transactional consistent state to another transactional consistent state. A transactional consistent state is one in which a database of a database system is able to reflect all changes made by committed transactions and none of the changes made by uncommitted transactions. As described above, a DBMS records commit LTs for committed changes such that a logical time is associated with each consistent state.

The use of LTs to mark changes made to a database allows determination of when (relative to other changes made within a database) particular events occurred, and which changes to data within a database should be reflected in the results of a query issued over the database.

Database Queries

A user may submit database queries to database sessions that connect the user to a pluggable database. Such database queries initiate one or more transactions that run over the pluggable database.

A database query may be represented by a database statement that conforms to a database language. Examples of database languages include a Structured Query Language (SQL) that conform to American National Standards Institute (ANSI) standards, and propriety forms (e.g. PL/SQL, other proprietary SQL standards, etc.). A database command may be in the form of a database statement that conforms to a database language. An illustrative example database language for expressing database commands is Structured Query Language (SQL). Data manipulation language (DML) instructions are issued to a DBMS to manage data stored within a database structure, and SELECT, INSERT, UPDATE, and DELETE are common examples of DML instructions found in SQL implementations. Data definition language (DDL) statements are statements that cause performance of one or more of: create, alter, and drop schema objects; grant and revoke privileges and roles; analyze information on a table, index, or cluster; establish auditing options; and add comments to the data dictionary; etc.

When a query is computed by a database server instance, the query is computed relative to an LT, which is referred to herein as the LT of the query or the LT assigned to the query. The results computed reflect the consistent state associated with the LT of the query. According to an embodiment, such consistency is provided using a consistent read approach.

A consistent read approach provides results of queries based on the LT of the query, which may be a past LT. For example, in a primary CDB 210, a data block may contain changes for an LT that occurs later than the LT of the query (i.e. made by transactions with later LTs), or even changes for uncommitted transactions. To determine the previous state of the data block for the LT of the query, database server instance 142 undoes the changes by applying undo records. The results of the query are based on the resulting snap shot of the data block, i.e., the state of the data block at the point in time marked by the LT of the query with necessary undo applied to undo changes for transactions that were not yet committed as of the LT of the query.

Like a redo record, an undo record records a change made by a transaction to a data block, between the version of the data block previous to the change and the subsequent version of the data block resulting from the change. Furthermore, an undo record contains enough information to reproduce the previous version from a copy of the subsequent version. Using information in an undo record to reproduce a previous version of a data block prior to the change recorded by the undo record, is an operation referred to herein as applying the undo record. Thus, according to an embodiment, consistent read involves applying undo records needed to undo changes made to a data block prior to the LT of the query.

Undo records are stored in data blocks, which, according to embodiments, are within the pluggable database in which the recorded changes were made. Addition of undo records to a data block, like other changes to data blocks, is recorded by a redo record.

LT Services

According to embodiments, a DBMS manages LTs using one or more LT services. An LT service is a service from which a database server instance obtains LTs to associate with events occurring within a database. An LT service maintains, and makes available, a current LT applicable to databases associated with the LT service as described in further detail below.

A database server instance may maintain an LT service within a system global area of the instance. Further, the instance may maintain an LT service at any location that is accessible to the database server instance, such as: in memory; on disk of the server device that hosts the instance; within one or more database objects stored in an accessible database; etc.

An LT service may be implemented in any way, according to embodiments. According to one or more embodiments, an LT service is a data structure (e.g., an element of an array, a bucket of a hash table, a particular object in a linked list, etc.) that a database server instance creates and maintains within a system global area. The data structure for an LT service stores at least a current LT. In this embodiment, description of a database server instance requesting an LT from an LT service refers to the instance retrieving, from the data structure for the LT service, the required LT. The database server instance managing the data structure of an LT service increments the current LT stored in the data structure as needed. According to other embodiments, an LT service is a process (such as a Daemon process) that runs on a computing device.

A database server instances may coordinate an LT service with LT services of other instances, such as when the database server instance is part of a cluster of nodes that manage a particular CDB. In this way, a current LT maintained by an LT service may be incremented based on activity on the other nodes, thereby allowing actions taken among the nodes of the cluster to be logically ordered as a whole.

Active and Non-Active Refreshable Pluggable Database Clones

According to embodiments, a refreshable PDB clone (active or non-active) is only ever opened in read-only mode; as such, the content of a PDB clone is either frozen, or being updated based on data from the source PDB of the clone. As stated previously, refreshing a PDB clone incorporates, into the PDB clone, the latest changes made to the clone's source PDB.

For example, when a refreshable PDB clone is first created, the managing database server instance initializes a refresh reference time stamp for the PDB clone to be the LT (of the source PDB) that marks the time at which the source PDB was in the same state as the PDB clone (e.g., LT=850). After the PDB clone is created, write operations continue to be processed within the source PDB, i.e., the source PDB is operating in read-write mode. The database server instance 152 that manages the refreshable PDB clone performs a refresh operation on the PDB clone, which results in the PDB clone being in the state that the source PDB was in at LT=1000 (e.g., LT=1000 was the time stamp associated with the most recent change record from the source PDB that was applied to the PDB clone). The refresh reference time stamp for the PDB clone is updated each time the clone is refreshed.

According to embodiments, a non-active refreshable PDB clone is not associated with any PDB-specific LT service and, as such, must be closed to all other operations (including read operations) for the duration of a refresh operation on the PDB clone. No queries may be run over data that is being updated within a non-active refreshable PDB clone because the only LT that is applicable to the PDB clone is the refresh reference time stamp (since a non-active refreshable PDB clone is not associated with any PDB-specific LT service). There is no way of maintaining ACID properties for a query while the non-active PDB clone data is changing during the refresh operation. This closure limits accessibility of up-to-date information within the non-active refreshable PDB clone.

To illustrate querying a non-active refreshable PDB clone, with the refresh reference time stamp of a non-active PDB clone being set to LT=500, a user issues a query over the non-active PDB clone. Because the non-active PDB clone is not associated with a PDB-specific LT service, the query is assigned an LT from a shared LT service for the CDB in which the non-active PDB clone resides. Because the refresh reference time stamp of the non-active PDB clone is LT=500, the query will function properly only when set to exclude data with LT greater than 500. Thus, in this example, the database server instance managing the shared LT service sets the current LT maintained by the shared LT service to at least LT=500 before assigning an LT to the query, which ensures that the query will run correctly within the non-active PDB clone.

According to embodiments, a refreshable PDB clone may be associated with a PDB-specific LT service, which service facilitates querying the refreshable PDB clone during a refresh operation. A refreshable PDB clone that is associated with a PDB-specific LT service is referred to herein as an active refreshable PDB clone.

For example, in the context of FIG. 2, a user produces active refreshable PDB clone 250, in CDB 230, where PDB clone 250 is the clone of source PDB 220 in CDB 210. While PDB clone 250 is depicted in FIG. 2 within a different CDB than the source of the cloned PDB, a PDB clone may be located in the same CDB as the source PDB.

Because PDB clone 250 is an active refreshable PDB clone, instance 152 establishes a PDB-specific LT service 288 to provide LT service for PDB clone 250. For example, when PDB clone 250 is first established, database server instance 152 determines that no PDB-specific LT service exists that can provide PDB-specific LT service to PDB clone 250. In response, instance 152 establishes LT service 288 and associates LT service 288 with PDB clone 250 (e.g., in mapping data maintained by instance 152, etc.). Instance 152 determines the refresh reference time stamp of PDB clone 250, and initializes the current LT (which is a query LT) maintained by PDB-specific LT service 288 to be the refresh reference time stamp. According to embodiments, the refresh reference time stamp of an active refreshable PDB clone is maintained as the current (or query) LT by the PDB-specific LT service that serves the PDB clone.

According to embodiments, instance 152 continuously tracks, during a refresh operation, the most recent LT at which PDB clone 250 has been updated (or the most recent refresh reference time stamp) based on the data from source PDB 220. The current LT maintained by LT service 288 reflects this continuously updated LT for the active refreshable PDB clone 250.

Querying an Active Refreshable PDB During a Refresh Operation

Associating a PDB-specific LT service with a refreshable PDB clone facilitates queries over the changing data of the PDB clone because the current LT maintained by such a PDB-specific LT service automatically and continuously reflects the LT of the most recent changes that have fully committed within the active refreshable PDB clone. Using this continuously updated query LT, the DBMS may maintain ACID properties for transactions running over an active refreshable PDB clone while the clone is undergoing a refresh operation. FIG. 3 depicts a non-limiting flowchart 300 for performing read operations on an active refreshable PDB clone while the PDB clone is undergoing a refresh operation.

At step 302 of flowchart 300, a refresh operation is performed on a cloned pluggable database based, at least in part, on redo entries recorded for a source pluggable database. For example, instance 152 performs a refresh operation on PDB clone 250, where the source PDB of PDB clone 250 is PDB 220 as described above.

According to embodiments, in connection with initiating the refresh operation, instance 152 requests, from instance 142, those redo entries that were recorded for PDB 220 that have not yet been applied to PDB clone 250. For example, instance 152 includes, in the request for redo entries from instance 142, the refresh reference time stamp for PDB clone 250 (which marks the latest changes from PDB 220 that have been fully applied to PDB clone 250). In response to receiving this request, database server instance 142 collects, from redo log(s) 270, those redo entries that are associated with LTs after the refresh reference time stamp of PDB clone 250 and instance 142 sends those redo entries to instance 152.

According to further embodiments, database server instance 142 continuously sends redo entries, recorded for PDB 220, to instance 152 to facilitate instance 152 performing a continuous refresh operation on PDB clone 250. In these embodiments, instance 152 does not need to initiate discreet refresh operations to refresh PDB clone 250 since instance 142 automatically sends, to instance 152, all redo entries recorded for PDB 220 without requiring a specific request for such.

When instance 152 receives the redo information from instance 142, instance 152 applies the redo information to PDB clone 250. Specifically, instance 152 applies changes, indicated in the received redo information, to PDB clone 250 thereby bringing PDB clone 250 up-to-date with the data in PDB 220.

According to embodiments, applying redo information recorded for source PDB 220 to PDB clone 250 requires reference translation based on foreign reference mapping data stored by instance 152. This mapping data maps reference identifiers referencing aspects of PDB 220 to reference identifiers referencing corresponding aspects of PDB clone 250, where such aspects includes one or more of: file identifiers/numbers, data block identifiers, pluggable database identifiers, database names, etc. Using this mapping data, instance 152 translates reference information, in the retrieved redo entries, from foreign references (relative to source PDB 220) to local references (relative to PDB clone 250). The redo information is applied to PDB clone 250 using the translated local references.

While active refreshable PDB clone 250 is undergoing a refresh operation, the current LT maintained by PDB-specific LT service 288 is continuously updated to reflect the LT of the latest redo entries, from source PDB 220, that represent changes that have been fully applied to PDB clone 250. For example, while applying received redo entries to PDB clone 250, instance 152 determines that all changes in the redo entries recorded at or before LT=1020 have been applied to (and committed in) PDB clone 250. In response to this determination, instance 152 updates the current LT maintained at LT service 288 to LT=1020. This change of the current LT within LT service 288 does not affect the current LT maintained by LT service 286.

After updating the current LT maintained by LT service 288 to LT=1020, and while the refresh operation initiated in step 302 is still ongoing, instance 152 determines that all changes in the redo entries from PDB 220 that are associated with an LT at or before LT=1025 have been applied to (and committed in) PDB clone 250. In response to this determination, instance 152 again updates the current LT maintained at LT service 288 from LT=1020 to LT=1025. Instance 152 may update the current LT maintained at LT service 288 at any time interval (up to real-time continuous updating) during a refresh operation on an associated PDB clone within embodiments.

Returning to flowchart 300 (FIG. 3), at step 304, while performing the refresh operation on the cloned pluggable database, a query over the cloned pluggable database is received. For example, while performing the refresh operation on PDB clone 250, instance 152 receives, via a database session, a query that reads particular data from PDB clone 250.

At step 306, an LT for the query is determined based on a first LT service that is maintained for the cloned pluggable database; wherein the first LT service maintained for the cloned pluggable database is distinct from a second LT service that is maintained for a container database that contains the cloned pluggable database. For example, when instance 152 receives the query over PDB clone 250, instance 152 identifies an LT for the query. Since PDB clone 250 is associated with a PDB-specific LT service (i.e., LT service 288), instance 152 associates the current LT, maintained by LT service 288 at the time the query was received, with the query (e.g., LT=1025).

FIG. 2 depicts an example configuration in which a single shared LT service 246 is maintained by instance 142 and two LT services (shared LT service 286 and PDB-specific LT service 288) are maintained by instance 152. PDB-specific LT service 288 is distinct from shared LT service 286, which provides LTs for changes within CDB 230 that do not occur within PDBs associated with a PDB-specific LT service.

In the context of FIG. 2, a shared PDB service is associated with a particular primary CDB and provides LTs to associate with events occurring in any pluggable database, within the particular CDB, that is not associated with a PDB-specific LT service. The current LT maintained by a shared LT service is incremented as needed to order events occurring within the associated CDB, e.g., to assign a new commit LT to a commit record for a transaction committing in the CDB. In a system with only one shared LT service, such as the system depicted in FIG. 2 for instance 142, all LTs being assigned to database objects in CDB 210 are provided by the single shared LT service.

According to embodiments, (and in the context of the example described for flowchart 300) instance 152 requests an LT to assign to the query using the identifier of PDB clone 250, which directs instance 152 to LT service 288, which is the PDB-specific LT service for PDB clone 250. According to an embodiment, PDB-specific LT services are implemented as buckets in a hash table, where the key to the hash table is the PDB identifier. Instance 152 computes an index into the hash table by hashing the PDB identifier of PDB clone 250. Instance 152 uses the computed index to access the bucket in the hash table associated with PDB clone 250 (which is the bucket corresponding to LT service 288).

If a PDB identifier of a given PDB does not hash to a bucket of the LT service hash table, then there is not a PDB-specific LT service associated with that PDB. In that case, database server instance 152 uses a default LT service such as shared LT service 286, which provides LTs for all database objects in CDB 230 that are not associated with a PDB-specific LT service.

Because the current LT within the PDB-specific LT service 288 for PDB clone 250 is being continuously updated, assigning to the query an LT from LT service 288 associates the query with the LT that indicates the most recently-completed updates to PDB clone 250. This association will cause the query to be executed over all data within PDB clone 250 that is current as of the most recent LT of changes applied from source PDB 220.

LT service 288 is described herein as providing LTs for PDB clone 250. Nevertheless, according to embodiments, LT service 288 may provide LTs for a group of PDB clones (including both PDB clones 250 and 254). According to further embodiments, a distinct PDB-specific LT service (not depicted in FIG. 2) provides LTs for PDB clone 254.

Returning to flowchart 300, at step 308, the query is executed over the cloned pluggable database based, at least in part, on the LT for the query. For example, instance 152 includes, in the results of the query, any data in PDB clone 250 that has been committed at or before the query LT (e.g., LT=1025). Since the query LT was the current LT for PDB clone 250 at the time the query was received, the query is performed over logically complete data within PDB clone 250 without regard to changes made to the PDB after the query's LT. Therefore, the results of the query include the latest changes applied to PDB clone 250 while excluding any updates made within PDB clone 250 that are not yet fully applied.

Shared LT Service Functionality

According to embodiments, instead of tracking progress of a foreign LT as with a PDB-specific LT service, a shared LT service is used to maintain ACID properties for transactions performing read and write operations within the associated CDB in a manner similar to more traditional system change numbers. For example, as changes are made within root database 232 and within PDB 252, which is not associated with a PDB-specific LT service, instance 152 utilizes and increments the current LT maintained by shared LT service 286 as a clock to order the changes occurring within CDB 230 as described above.

To illustrate, a user issues a query over PDB 252 to a database session that facilitates queries over PDB 252. Instance 152 retrieves the current LT (LT=700) from shared LT service 286 and assigns that current LT to the query. As such, instance 152 executes the query with regard to data that is committed as of LT=700 and excludes, from query operations, any data updated, by transactions other than the one or more transactions initiated for the query, after LT=700. Any transactions, initiated by the query, that commit are assigned commit LTs that are greater than LT 700. For example, to retrieve a commit LT for a transaction initiated by the query, instance 152 requests an incremented current LT from LT service 286. Instance 152 assigns the incremented current LT from shared LT service 286 to be the commit LT for the transaction.

A PDB-Specific LT Service that Serves a Group of Pluggable Databases

According to an embodiment, a particular PDB-specific LT service maintains the current LT for a group of multiple pluggable databases. For example, FIG. 2 depicts a second active refreshable PDB clone 254 in CDB 230, which is the clone of PDB 222 in CDB 210. Thus, in the embodiment depicted in FIG. 2, both of the active refreshable PDB clones in CDB 230 are clones of source PDBs within the same CDB 210.

Since both PDB clones 250 and 254 are both being refreshed from the same redo stream (indicated in redo log(s) 270) from CDB 210, then, according to embodiments, PDB clones 250 and 254 are refreshed jointly. In such embodiments, the current LT of both PDB clones 250 and 254 is the same LT, which is tracked by a single PDB-specific LT service, such as LT service 288. As changes from the redo stream from instance 142 are fully applied to both PDB clones 250 and 254, instance 152 updates the current LT of PDB-specific LT service 288 to reflect the LT of these latest fully-applied changes from PDB 220. Accordingly, any queries running over either of PDB clones 250 and 254 are assigned query LTs from PDB-specific LT service 288.

According to an embodiment, instance 152 sets PDB clones 250 and 254 up as a group of PDBs that are serviced by the same LT service. For example, after PDB clone 250 is established within CDB 230 (with the associated PDB-specific LT service 288), instance 152 determines that a second PDB clone 254 is established within CDB 230. In response to determining that the second PDB clone 254 is established within CDB 230, instance 152 determines whether PDB clone 254 is refreshed based on the same redo stream as another PDB clone within CDB 230 (i.e., PDB clone 250). In response to determining that PDB clones 250 and 254 are refreshed based on the same redo stream, instance 152 automatically establishes PDB clones 250 and 254 as a group of PDB clones that are serviced by PDB-specific LT service 288.

According to another embodiment, after both PDB clones 250 and 254 have both been established within CDB 230, instance 152 receives a DDL statement that indicates that both of PDB clones 250 and 254 should be considered a group of PDBs associated with a single PDB-specific LT service. In response to receiving the DDL statement, instance 152 establishes PDB clones 250 and 254 as a group of PDB clones that are serviced by PDB-specific LT service 288.

According to embodiments, instance 152 determines that PDB clone 254 is refreshed based on a different redo stream than PDB clone 250. In response, instance 152 establishes a distinct PDB-specific LT service (not depicted in FIG. 2) to provide LT service for PDB clone 254. According to embodiments, in the absence of a DDL statement that indicates that both of PDB clones 250 and 254 should be considered a group of PDBs associated with a single PDB-specific LT service, instance 152 establishes a distinct PDB-specific LT service (not depicted in FIG. 2) to provide LT service for PDB clone 254.

In these embodiments, the current LT maintained by the PDB-specific LT service that services PDB clone 254 is continuously updated (as described above) based on the LT of the latest changes applied to PDB clone 254 from its source PDB without regard to the current LT in any other LT service accessible by instance 152.

Primary and Standby Container Databases

Figure 4A:
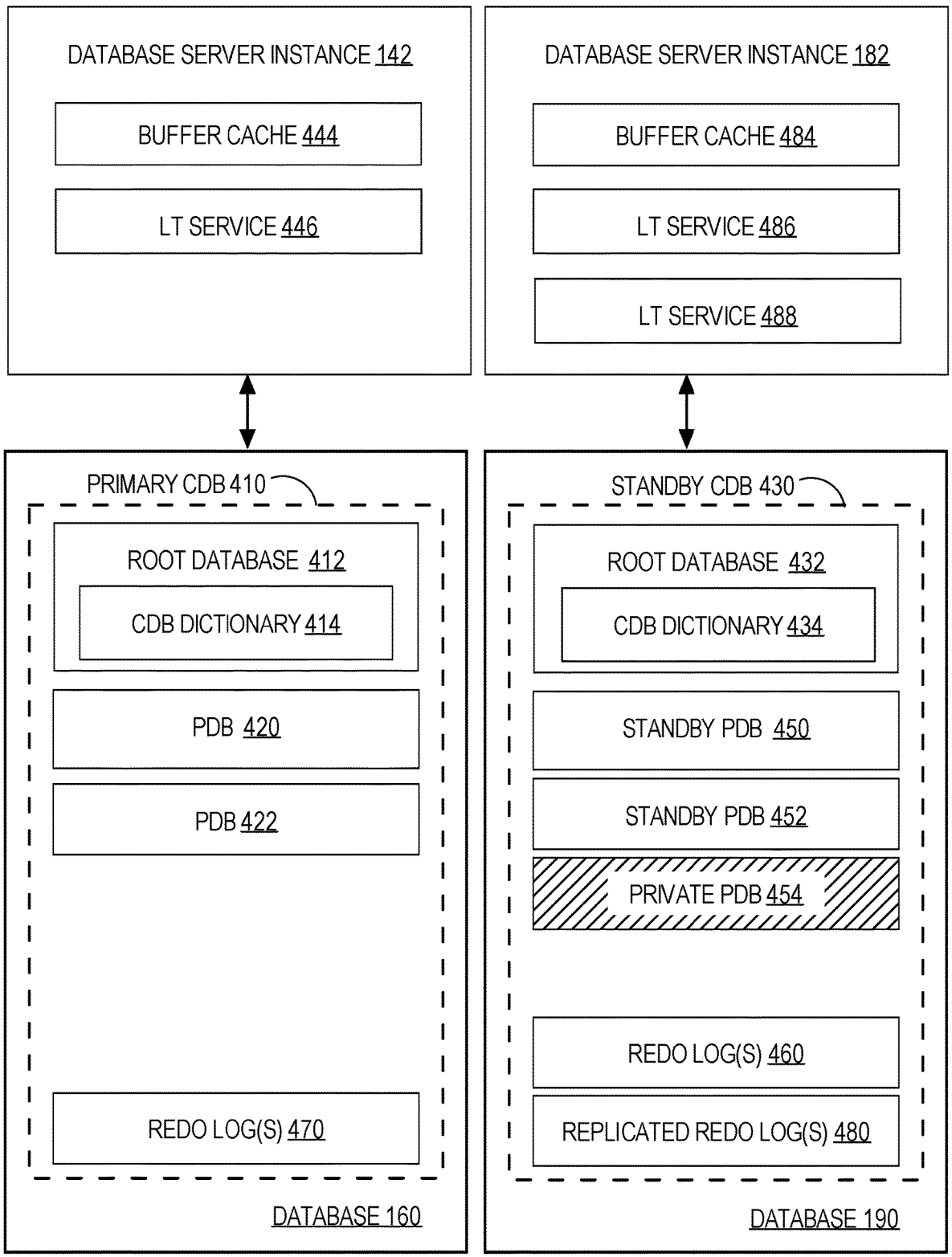
FIGS. 4A-4B depict example resource arrangements detailing database server instances and primary and standby container databases.
Figure 4B:
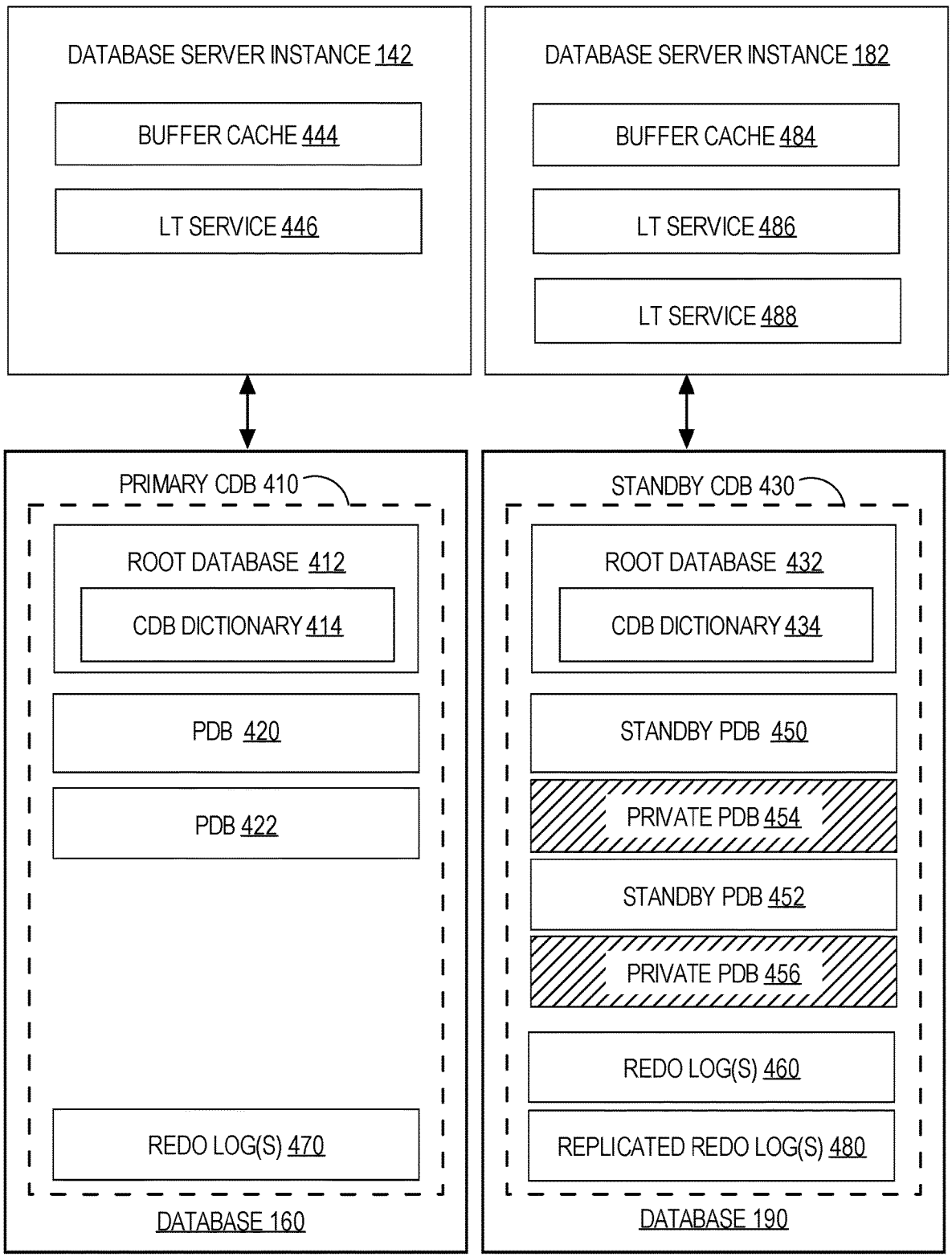

An embodiment of PDB-specific LT service can be utilized to facilitate queries in a standby container database, where a standby container database is a refreshing replica of a primary (or source) container database. An example primary source CDB and physical standby CDB are illustrated by FIGS. 4A and 4B, in which example configurations of database server instances 142 and 182, and also of databases 160 and 190 are depicted. In FIGS. 4A and 4B, standby CDB 430 in database 190 is a physical replica of primary CDB 410 in database 160.

According to embodiments, database server instance 142 opens root database 412 of primary CDB 410 in read-write mode. As such, pluggable databases 420 and 422, contained in primary CDB 410, may be opened either in read-write or in read-only mode. Database server instance 142 maintains a shared LT service 446 that is associated with, and provides LTs for, all database objects within CDB 410. Accordingly, the current LT maintained by LT service 446 is advanced for any change made within any database object within CDB 410, as described above.

Database server instance 182 opens root database 432, of standby CDB 430, in a standby mode and causes CDB 430 to replicate primary CDB 410. Since primary CDB 410 is the source of standby CDB 430, standby CDB 430 replicates changes, made to data blocks in primary CDB 410, to replicas of these data blocks in standby CDB 430. (See, e.g., Oracle Active Data Guard ("ADG"), described in "Oracle Active Data Guard: Real-Time Data Protection and Availability", An Oracle White Paper, October 2015, incorporated by reference above.) Standby PDBs 450 and 452, in standby CDB 430, respectively replicate PDBs 420 and 422 in primary CDB 410. Because standby PDBs 450 and 452 are in a CDB that is operating in a standby mode, and these PDBs are replicas of primary PDBs in the replicated system, PDBs 450 and 452 only operate in read-only mode. Operating the standby PDBs in read-only mode ensures that the standby PDBs consistently represent the data in their respective source PDBs.

Updating a Standby CDB Using Redo Records

As a physical standby system, standby CDB 430 is maintained up-to-date with the data in, and changes made to, primary CDB 410. According to embodiments, to maintain CDB 430 up-to-date, database server instance 142 provides, to database server instance 182, a redo stream from redo log(s) 470, which includes information about changes made to primary CDB 410. Database server instance 182 receives this stream of redo records and applies the changes indicated therein to data blocks of standby CDB 430.

Database server instance 182 maintains an LT service 486 associated with standby CDB 430. While database server instance 182 applies redo records from the redo stream to data blocks in standby CDB 430, instance 182 updates a current (or query) LT maintained by LT service 486 to reflect the LT of primary CDB 410 at which all of the changes in the redo stream from primary CDB 410 have been fully applied to standby CDB 430. In other words, when database server instance 182 has determined that records (from source CDB 410) up to a particular LT have been applied within standby CDB 420, instance 182 advances the latest-readable LT (maintained as the current LT of LT service 486) to that particular LT. (See, e.g., Query SCN described in "Oracle Active Data Guard, Oracle Data Guard 11g", an Oracle Maximum Availability Architecture White Paper, September 2011, found at http://www.oracle.com/technetwork/database/features/availability/maa-wp-11gr1-activedataguard-1-128199.pdf, the entire contents of which are incorporated by reference as if fully set forth herein. See also the Readable Physical Storage Replica Application, incorporated by reference above.)

Using the current LT maintained by LT service 486, database server instance 182 is able to compute queries over data in CDB 430 even while the data is being updated. In this way, database server instance 182 is able to compute queries over standby CDB 430, the results of which reflect a consistent state of primary CDB 410 that is no later than the latest-readable query time reflected by the current LT of LT service 486.

Creating a Private Read-Write PDB Within a Standby Container Database

Even though a physical standby system is configured to be a consistent replica of another system, it can still be helpful to perform write operations within a standby system, e.g., allowing creation of a transient table within a standby CDB to store intermediate data to facilitate query processing. As such, embodiments allow write operations within a standby container database without compromising read-only database objects within the standby container database. Specifically, according to embodiments, a private read-write pluggable database is established within a standby container database, which accommodates write operations within the standby system.

As an illustrative example, in FIG. 2A, standby CDB 430 is configured with a private read-write PDB 454. To configure standby CDB 430 with a private PDB, database metadata that defines the private PDB is stored in CDB dictionary 414 (i.e., in root database 412 of primary CDB 410). As indicated earlier, the database dictionary is central to a DBMS's management of a database. The database dictionary contains metadata that defines database objects physically or logically contained in the database. The metadata in a database dictionary is modified according to DDL commands issued to add, modify, or delete metadata defining database objects.

For example, a user issues a command, to database server instance 142, to add a private pluggable database within primary CDB 410. In response to receiving the command, database server instance 142 adds metadata that defines the private pluggable database to CDB dictionary 414. The metadata that defines the private pluggable database includes one or more of the following: registration information, files, file numbers, tablespaces, tablespace numbers, file to tablespace mapping, etc. According to embodiments, the metadata defining the private pluggable database also includes a flag that marks the PDB as a private PDB, which indicates that the PDB is a private pluggable database as described herein.

A private PDB is not configured to replicate data from a primary system. As such, any data stored within the private PDB in the standby CDB will not be overwritten because of data replication. Since the contents of the private PDB in the standby CDB are not affected by what is stored for the private PDB in the primary CDB, allocation of resources for the private PDB may be omitted altogether from the primary CDB. Thus, according to one embodiment, because the newly added PDB is of type private PDB, instance 142 does not allocate any resources within CDB 410 to store data for the private PDB.

According to another embodiment, instance 142 allocates resources within primary CDB 410 to store data for the private PDB, where data stored to the private PDB within CDB 410 is not replicated to standby CDB 430. For example, the metadata flag that marks the private PDB as private causes instance 142 to inhibit replication, to standby CDB 430, of data stored to the private PDB. Instance 142 may inhibit replication of data stored to the private PDB in primary CDB 410 by excluding, from redo entries sent to standby CDB 430, those redo entries that record changes made to data in the private PDB within primary CDB 410.

As another example, the metadata flag that marks the private PDB as private causes instance 182 to inhibit replication of changes, made to a private PDB within CDB 410, to a corresponding private PDB in standby CDB 430. Thus, the private PDB within a standby system may safely diverge from any data stored within any corresponding private PDB in the source primary CDB.

Because adding database metadata to CDB dictionary 414 constitutes a change to CDB 410, database server instance 142 generates one or more redo entries that reflect the addition, to CDB dictionary 414, of the database metadata that defines the private pluggable database. Instance 142 stores those redo entries to redo log(s) 470. When redo entries, from redo log(s) 470, are applied to CDB 430, the redo entries that record the changes to CDB dictionary 414 are applied to root database 432 of standby CDB 430 and the database metadata that defines the private pluggable database is replicated to CDB dictionary 434 in root database 432.

Allocating Resources for a Private PDB Within the Standby CDB

According to embodiments, in response to determining that the newly-defined private PDB is a private PDB based on the metadata flag indicating such, database server instance 182 automatically allocates resources (based on the details of the private PDB in the replicated metadata) within standby CDB 430. For example, database server instance 182 allocates memory to store data for the private PDB, which is depicted in FIG. 4A as private PDB 454.

To illustrate, instance 182 detects, in the replicated database metadata defining the private PDB, the flag that marks the private PDB as a private standby PDB. In response to determining that the database metadata marks the defined PDB as a private standby PDB, instance 182 establishes structure within standby CDB 430 for a read-write private PDB 454 as defined in the database metadata defining the private PDB. In other words, instance 182 automatically allocates memory, and other resources, for private PDB 454 and also automatically establishes the structure of private PDB 454 based on the database metadata defining the private PDB.

According to further embodiments, instance 182 allocates memory for a private PDB, and also establishes the structure of the private PDB, based on special redo markers included in the redo stream being applied to the standby CDB. For example, in connection with adding metadata defining a private PDB to CDB dictionary 414, instance 142 includes, in redo log(s) 470, one or more special redo markers that encode instructions to allocate resources and establish structure for the defined private PDB as indicated in the database metadata defining the private PDB. According to embodiments, instructions that may be encoded using special redo markers include: add file, drop file, add tablespace, drop tablespace, add private PDB, or drop private PDB, etc.

To illustrate, the new database metadata that defines a private PDB indicates that the private PDB includes two tablespaces, where each tablespace includes two files. Instance 142 creates a set of special redo markers for the new private PDB based on this definition of the private PDB such that execution of the instructions encoded in the special redo markers results in a private PDB with a data structure as indicated in the metadata.

As a more specific example, instance 142 includes, within redo log(s) 470, the following set of special redo markers (expressed in pseudocode):

(1) add private PDB 454
(2) add tablespace T1 to private PDB 454
(3) add file F1 to tablespace T1 in private PDB 454
(4) add file F2 to tablespace T1 in private PDB 454
(5) add tablespace T2 to private PDB 454
(6) add file F1 to tablespace T2 in private PDB 454
(7) add file F2 to tablespace T2 in private PDB 454

Instance 142 inserts the set of special redo markers in the redo stream represented within redo log(s) 470 in a location within the stream after one or more redo entries that record the change(s) to CDB dictionary 414 that added the database metadata that defines the private PDB.

Instance 182 receives the redo stream recorded in redo log(s) 470, which stream includes the special redo markers. Instance 182 executes the instructions indicated in the special redo markers to create a new private PDB (e.g., PDB 454 of FIG. 4), and, in so doing, instance 182 allocates resources and establishes structure for the private PDB as encoded in the special redo markers.

Instance 182 replicates, to standby CDB 430, replicated redo logs 480 recorded for primary CDB 410 (i.e., within redo logs 470). Specifically, database server instance 142 sends redo entries recorded for CDB 410 to instance 182 for replication, and instance 182 stores the replicated redo entries to replicated redo logs 480. In addition to replicated redo logs 480, instance 182 also establishes a redo stream (distinct from any replicated redo information), represented in FIGS. 4A-4B as redo log(s) 460, to record changes made in private PDBs within the standby CDB, such as PDB 454. Instance 182 stores, in redo log(s) 460, redo records that record all changes made within private PDBs in CDB 430.

PDB-Specific LT Service for a Private PDB

According to embodiments, instance 182 also initiates a PDB-specific LT service 488 and associates the service with private PDB 454 when private PDB 454 is first established within CDB 430. The PDB-specific LT service 488, which serves private PDB 454, is used to track the changes made within private PDB 454. As such, a current LT maintained by LT service 488 is incremented, as needed, in order to track events occurring within private PDB 454. According to embodiments, instance 182 retrieves LTs to assign to redo entries in redo log(s) 460 from PDB-specific LT service 488. LT service 488 maintains a current LT independent from the current LT indicating the latest-readable query time maintained by LT service 486 (where the current LT maintained by LT service 486 is dictated by the LT of primary CDB 410 as described above).

A PDB-specific LT service is required for private PDB 454 because private PDB 454 is not maintained in step with data from primary CDB 410. Because LT service 486, associated with CDB 430, reflects the latest-readable query time based on changes being applied from primary CDB 410 within CDB 430, the current LT maintained by LT service 486 cannot be incremented and used as a logical clock as needed to maintain ACID properties for transactions running within private PDBs in CDB 430.

Write Operations to a Private Pluggable Database Within a Standby Container Database When a standby container database is configured with a private read-write pluggable database, a query may cause write operations to be performed within the standby container database by writing to the private read-write pluggable database. Such writes do not compromise the integrity of the replicated data within the standby container database since database objects that store replicated data are not affected by the write operations and since the private PDB does not contain or represent any replicated data. FIG. 5 depicts a flowchart 500 for utilizing a private PDB in a standby CDB to accommodate a write operation caused by a query over a read-only standby PDB in the standby CDB.

At step 502, a first query is executed over a read-only pluggable database in a standby container database that replicates data from a primary container database, where the first query requires a write operation. For example, a user requests, from database server instance 182, a connection with standby PDB 450 (according to the embodiment depicted in FIG. 4A and described above). In response to receiving the connection request, database server instance 182 establishes a database session that allows the user access to standby PDB 450, i.e., including attaching the PDB dictionary for standby PDB 450 to the session.

The user issues a query over PDB 450 to the database session. According to an embodiment, the query does not explicitly require a write operation. However, database server instance 182 selects an execution plan, for executing the query, that requires a write operation (e.g., to a transient table created by a user). Thus, the query requires a write operation because the execution plan selected to execute the query requires a write operation. According to an embodiment, database server instance 182 produces and/or is able to select an execution plan that requires a write operation because of the existence of a private read-write PDB within CDB 430. Without such a private read-write PDB, no write operation is able to be performed on a standby CDB.

When a user queries data from standby CDB 430, the query is assigned the current LT maintained by LT service 486. Thus, continuing with the above example, the query from the user, over data in standby PDB 450, is assigned the current LT maintained by LT service 486.

According to embodiments, steps 504-508 of flowchart 500 are performed as part of executing the query referred to in step 502.

At step 504, a second operation is automatically generated, where the second operation performs the write operation in a private pluggable database in the standby container database. Continuing with the example of step 502, database server instance 182 automatically performs the write operation, indicated in the execution plan, within private PDB 454. More specifically, database server instance 182 automatically formulates a recursive operation (such as a DDL/DML operation) over private PDB 454. The recursive operation performs the write operation, from the query execution plan, within private PDB 454 (even though the original query did not refer to private PDB 454). The recursive operation is similar to an operation performed, via a dblink, to a separate database/PDB (that is separate from the database/PDB on which the query that initiated the dblink is run), where the separate database/PDB is private PDB 454 residing in the same CDB 430 as standby PDB 450.

According to one embodiment, private PDB 454 is used to accommodate the write operation included in the query plan because private PDB 454 accommodates all write operations performed within standby CDB 430. According to another embodiment, private PDB 454 is used to accommodate the write operation required by the query over standby PDB 450 because private PDB 454 is the private PDB that corresponds to standby PDB 450 (as described in further detail below).

At step 506, an LT for the second operation is determined based on a first LT service maintained for the private pluggable database, where the first LT service maintained for the private pluggable database is distinct from a second LT service maintained for the standby container database. Continuing with the above example, prior to executing the recursive operation over private PDB 454, instance 182 assigns, to the recursive operation, the current LT maintained by a PDB-specific LT service (488) that serves private PDB 454. This LT assignment allows instance 182 to maintain ACID properties for transactions initiated by the recursive operation over private read-write PDB 454 in light of potentially changing data within PDB 454.

At step 508, the second operation is executed based, at least in part, on the LT determined for the second operation. For example, database server instance 182 executes the recursive operation, generated to carry out at least the portion of the execution plan for the user query that includes the write operation, based on the query LT assigned to the recursive operation. More specifically, instance 182 excludes, from recursive operations, any data updated (by transactions other than one or more transactions initiated for the user query) after the LT of the recursive operation, as well as excluding uncommitted changes made by other transactions.

Continuing with the example of step 506, the recursive operation that performs the write operation over PDB 454 writes a portion of data retrieved from standby PDB 450 to a table within PDB 454. To illustrate, execution of the recursive operation causes instance 182 to create a table within a tablespace allocated for private PDB 454 and causes instance 182 to write data to the able. Instance 182 creates redo records that record the changes made to private PDB 454 and stores the redo records within redo log(s) 460.

Depending on the requirements of the query execution plan, data written to private PDB 454 may need to be combined with data from standby PDB 450, e.g., via a join operation. In this case, database server instance 182 transparently and automatically creates a link between standby PDB 450 and private PDB 454 if such a link has not yet been established during the current database session. For example, after a user creates a transient table T (as described in the above example) in PDB 454, the user submits a query that joins table T with another table S in PDB 450. To execute the query, database server instance 182 translates the operation into a distributed query that represents a join, over a dblink, of table S in PDB 450 and remote table T in PDB 454. (More information about database links ("dblinks") is found in "Database Links", an Oracle article included in the Oracle Database Online Documentation 11g Release 1 (11.1), located at this time at "ds_concepts002.htm" under the URL "docs.oracle.com/cd/B28359_01/server.111/b28310", the entire contents of which are incorporated by reference as if fully set forth herein.)

The required data combination (a distributed join) is performed via the database link between standby PDB 450 and private PDB 454 in a manner similar to a distributed operation over multiple databases. (See, e.g., "Accessing and Modifying Information in Multiple Databases", an Oracle article included in the Oracle Database Online Documentation 11g Release 1 (11.1), located at this time at "tdpii_distdbs.htm" under the URL "docs.oracle.com/cd/B28359_01/server.111/b28324", the entire contents of which are incorporated by reference as if fully set forth herein.) For cost evaluation purposes, joining data between PDBs in the same CDB is similar to an internal join, in that an internal join and joining data between PDBs within the same CDB are both more efficient than joining data across disparate databases over a network.

Explicit Write Operation in a User Query

According to further embodiments, the user query requires a write operation in that the user's query itself performs a write operation within standby CDB 430. In these embodiments, database server instance 182 automatically performs any write operation (instructed to be performed in a standby PDB) within a private read-write PDB such as private PDB 454. In this way, a private PDB within the standby CDB accommodates write operations that a user query purportedly performs on one of the standby pluggable databases in the standby CDB.

For example, a query requests performance of a write operation on standby PDB 450. Instead of writing to PDB 450, instance 182 causes the write operation to be performed in private PDB 454. In these embodiments, instance 182 also retrieves any data purportedly written within the standby CDB from the private PDB within which the data was actually written.

According to another embodiment, private PDB 454 is made available for users to reference directly within a user query for write operations in the query. For example, a query over standby CDB 430 explicitly includes a write operation to private PDB 454.

Private PDBS Mirror the Structure of Standby PDBS

According to embodiments, to accommodate user queries that write to standby PDBs, database server instance 182 automatically creates, for each standby PDB within a standby CDB, a corresponding private read-write PDB. This embodiment is depicted in FIG. 4B, in which standby PDB 450 corresponds to private PDB 454 and standby PDB 452 corresponds to a private PDB 456 (which is a private PDB as described above). According to embodiments, a separate LT service (distinct from LT service 488 and not depicted in FIG. 4B) is the PDB-specific LT service for private PDB 456. According to embodiments, private PDBs 454 and 456 are a group of PDBs that both utilize the same PDB-specific LT service 488, where instance 182 increments a current LT maintained by LT service 488 to track changes made within both private PDBs 454 and 456.

The private PDB that corresponds to a standby PDB mirrors the structure of the standby PDB. Thus, in the example of FIG. 4B, private PDB 454 mirrors the structure of standby PDB 450 and private PDB 456 mirrors the structure of standby PDB 452. In this way, a user may include, in user queries, write operations that write to particular structures in standby PDBs and the write operations are redirected to corresponding structures within the corresponding private PDB.

For example, a user query requires creating a new table within file "F1" in tablespace "T2" of PDB 450. Instance 182 automatically creates a recursive query over private PDB 454, which corresponds to PDB 450, that writes the new table within corresponding file "F1" in corresponding tablespace "T2" of PDB 454. Executing a recursive query over a corresponding private PDB is described in further detail below.

According to embodiments, database objects within a private PDB are identified using identifiers that are derivable from the identifiers of corresponding database objects within the corresponding standby PDB. For example, the identifiers of corresponding database objects, within corresponding standby and private PDBs, are the same. According to these embodiments, instance 182 formulates a query over a private PDB using identifiers of database objects within the private PDB that are derived from the identifiers indicated in the user query over the corresponding standby PDB.

Automatically Creating Private PDBS

According to an embodiment, for each standard PDB in primary CDB 410, database server instance 142 automatically creates a record, within CDB dictionary 414, of a corresponding private PDB (without requiring an explicit command from the user to create these private PDBs). For example, the user configures instance 142 to automatically create mirroring private PDBs for the PDBs in primary CDB 410. Thus, in the example configuration of FIG. 4B, instance 142 automatically adds database metadata that defines two private PDBs to CDB dictionary 414, one private PDB to correspond to each of PDBs 420 and 422, respectively. As described above, propagation of the redo stream recording changes (and, at times, special redo markers) with information about these private PDBs to CDB dictionary 434 within standby CDB 430 initiates creation of private PDBs 454 and 456 within CDB 430.

According to embodiments, the structure of a private PDB (that corresponds to a particular primary PDB) mirrors the structure of the particular primary PDB. According to such an embodiment, instance 142 causes the metadata defining a private PDB, within CDB dictionary 414, to describe a structure for the private PDB that mirrors the structure of the particular primary PDB to which the private PDB corresponds.

To illustrate, database server instance 142 produces metadata to define a private PDB that corresponds to standard PDB 420, where standard PDB 420 includes two tablespaces ("T1" and "T2"), each with two files ("F1" and "F2"). As such, instance 142 configures the database metadata that defines the private PDB to include two tablespaces ("T1" and "T2"), each with two files ("F1" and "F2") such that the structure described within metadata for private PDB 454 mirrors the structure of PDB 420.

When instance 182 creates the private PDB 454 that corresponds to standard PDB 420 (and, accordingly, also corresponds with standby PDB 450 that replicates the data from PDB 420), the structure of private PDB 454 mirrors the structure of corresponding standby PDB 450 within standby CDB 430.

Furthermore, any changes to the structure of a primary PDB must be made also to the corresponding private PDB. Thus, instance 142 updates the metadata of a private PDB (and, at times, creates a set of special redo markers) to reflect any changes made to the primary PDB that corresponds to the private PDB. According to embodiments, instance 142 maintains, within root database 412 or other storage accessible to instance 142, mappings between PDBs within primary CDB 410 and identifiers of their corresponding private PDBs (which identifiers are used within special redo markers to target the private PDB).

For example, a user causes instance 142 to create a new file F3 within a particular tablespace T1 in PDB 420. Because PDB 420 is known to have a corresponding private PDB (which is PDB 454 in CDB 430), in connection with changing the structure of PDB 420, instance 142 also creates and stores, to redo log(s) 470, a new special redo marker that encodes the instruction: "add file F3 to tablespace T1 in private PDB 454". Thus, PDB 420 (and PDB 450) and its corresponding private PDB 454 maintain mirroring structures.

According to embodiments, database server instance 182 automatically makes changes to private PDBs within standby CDB 430 to conform the structure of the private PDBs to corresponding standby PDBs. In such embodiments, when instance 182 determines that a change to the structure of a standby PDB is effectuated (i.e., based on application of redo entries recorded for primary CDB 410), instance 182 automatically affects a similar change to the structure of the private PDB that corresponds to the changed standby PDB. According to embodiments, instance 182 maintains, within storage accessible to instance 182, mappings between standby PDBs within standby CDB 430 and their corresponding private PDBs.

For example, a user causes instance 142 to create a new file F3 within a particular tablespace T1 in PDB 420. According to the normal course of operations, instance 142 causes a redo entry to be stored in redo log(s) 470, where the redo entry records the change made to the structure of PDB 420. When database server instance 182 applies this redo entry to update standby CDB 430, instance 182 creates a new file F3 within tablespace T1 in PDB 450, which is the standby PDB that is a replica of PDB 420. In connection with effectuating this change, and because PDB 450 has a corresponding private PDB 454, instance 182 causes a new file F3 to also be created within tablespace T1 in private PDB 454.

Bookkeeping of Redo Entries Recording Similar Events

According to embodiments, each file has a file number, which must be unique within a given CDB. Because of this requirement, the file number for each file created within a CDB is generally allocated from the CDB's dictionary. In order to maintain uniqueness of file numbers within a private PDB in a standby CDB, a new file created within the private PDB is assigned a unique file number from primary CDB 410. In this way, primary CDB 410 manages all file numbers within both primary and standby systems, which safeguards against file number collisions that could occur if file numbers were independently chosen for files in the private PDB.

As such, database server instance 142 assigns a unique file number to the new file within private PDB 454. For example, instance 142 includes the unique file number within a special redo marker that encodes an instruction to create the new file within PDB 454. The new file within private PDB 454 is assigned the file number from instance 142.

Executing a Portion of a User Query Over a Private PDB

According to embodiments, private PDB 454 is used to accommodate write operations directed to standby PDB 450 because private PDB 454 is the private read-write PDB that corresponds to standby PDB 450. Likewise, any write operations directed to standby PDB 452 would be transparently redirected (as described herein) to private PDB 456, which corresponds to PDB 452. Thus, instead of issuing an error in response to the user performing a write operation on a read-only standby PDB, the DBMS causes the write operation to be performed on a corresponding private PDB.

To illustrate, a user requests that a particular object be created within tablespace T1 of standby PDB 450. Before executing the query, database server instance 182 creates, from the query submitted by the user, two queries: (1) a first component query over standby PDB 450 that performs read operations requested in the user's query; and (2) a second component query over corresponding private PDB 454 that performs the write operation within corresponding tablespace T1 of PDB 454, which is the tablespace within private PDB 454 that corresponds to tablespace T1 within PDB 450.

According to embodiments, the second component query over private PDB 454 also includes any read operations that read information that is stored in private PDB 454 (and not in standby PDB 450). For example, instance 182 automatically detects read operations, required by the user query, that read from objects that are written to private PDB 454 and instance 182 automatically includes those read operations within a query directed to private PDB 454. To illustrate, a user runs the following query over a table S in standby PDB 450: "create table T as select * from S". Database server instance 182 internally translates this query into (a) a first component query, which selects * from table S in PDB 450, and (b) a second component query that creates a table T within private PDB 454, and also populates the initial content of table T (i.e., with the results from table S), over a dblink between standby PDB 450 and private PDB 454.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
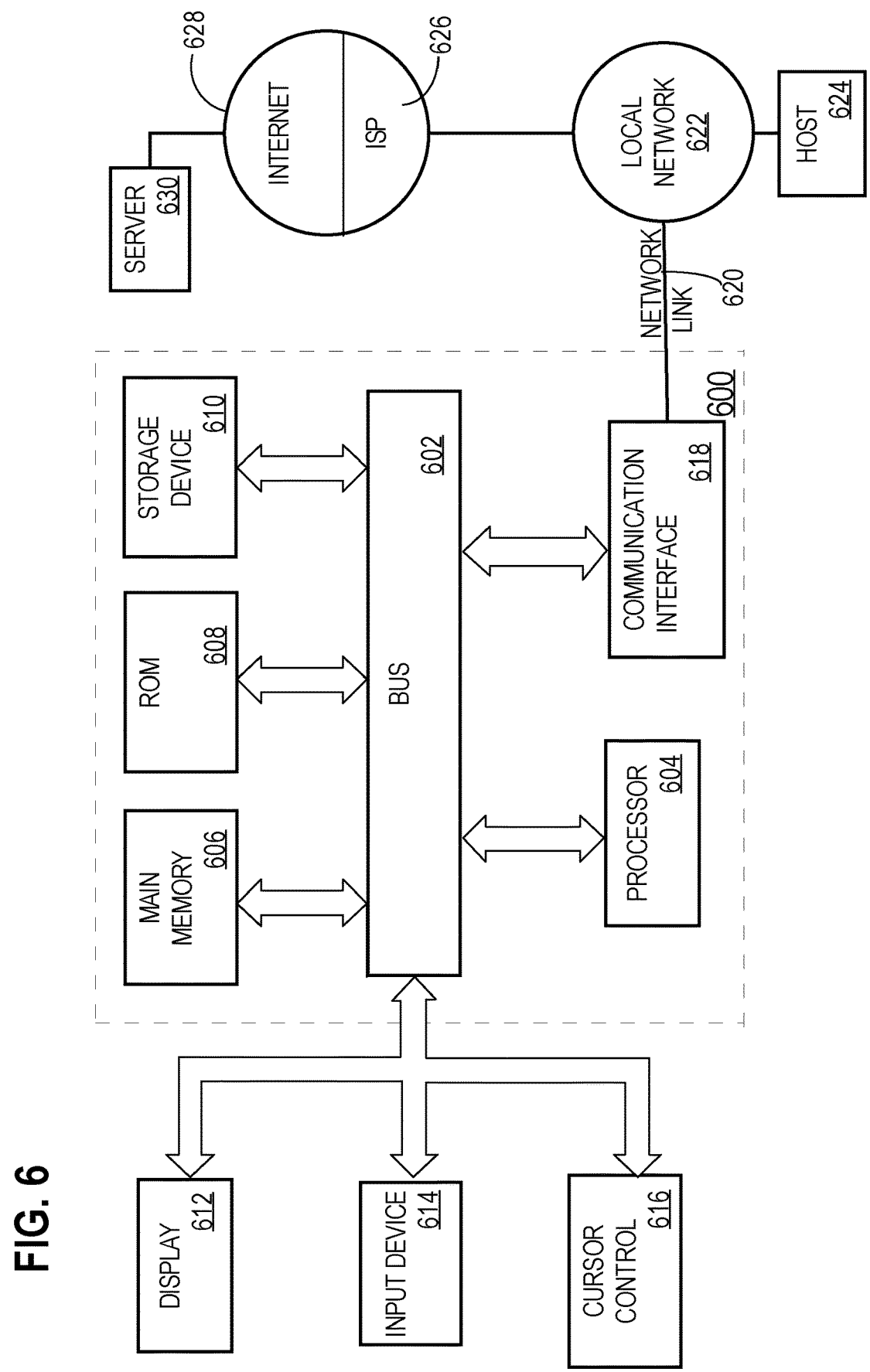
FIG. 6 is a block diagram of a computer system on which embodiments may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
   performing a refresh operation on a cloned pluggable database based, at least in part, on redo entries recorded for a source pluggable database;
   wherein said performing the refresh operation comprises applying changes, reflected in the redo entries recorded for the source pluggable database, to the cloned pluggable database;
   while performing the refresh operation on the cloned pluggable database, receiving a query over the cloned pluggable database;
   determining a query logical timestamp (LT) for the query based on a first LT service that is maintained for the cloned pluggable database;
   wherein the query LT reflects an LT of changes that have been applied, during the refresh operation, to the cloned pluggable database;
   wherein the first LT service maintained for the cloned pluggable database is distinct from a second LT service that is maintained for a container database that contains the cloned pluggable database;
   while performing the refresh operation, initiating execution of the query over the cloned pluggable database, wherein execution of the query is based, at least in part, on the query LT;
   wherein the method is performed by one or more computing devices.

2. The computer-executed method of claim 1, further comprising:
   while performing the refresh operation:
   determining an update LT, from the source pluggable database, at which all changes from the source pluggable database have been committed in the cloned pluggable database; and updating a current LT, maintained by the first LT service maintained for the cloned pluggable database, to be the update LT.

3. The computer-executed method of claim 1, further comprising:
receiving a second query over a second pluggable database contained by the container database;
determining a second LT for the second query based on the second LT service that is maintained for the container database; and
executing the second query over the second pluggable database based, at least in part, on the second LT.

4. The computer-executed method of claim 1, wherein:
determining the query LT comprises determining a current LT that is maintained by the first LT service; and
executing the query over the cloned pluggable database based, at least in part, on the query LT comprises retrieving, from the cloned pluggable database, data that has been tagged with an LT that is at most the query LT.

5. The computer-executed method of claim 1, wherein:
each of the first LT service and the second LT service identify a current LT; and
the current LT identified by the first LT service and the current LT identified by the second LT service are different LTs.

6. A computer-executed method comprising:
executing a query over a read-only pluggable database in a standby container database managed by a standby container database server;
wherein the standby container database server replicates data in a primary container database to the standby container database;
wherein the standby container database comprises a replica of data in the primary container database;
wherein the query requires a write operation;
wherein executing the query further comprises:
automatically generating a particular operation that performs the write operation in a private pluggable database in the standby container database,
determining a logical timestamp (LT) for the particular operation based on a first LT service maintained for the private pluggable database,
wherein the first LT service tracks logical timestamps of changes made within the private pluggable database,
wherein the first LT service maintained for the private pluggable database is distinct from a second LT service maintained for the standby container database, and
executing the particular operation based, at least in part, on the LT determined for the particular operation;
wherein the method is performed by one or more computing devices.

7. The computer-executed method of claim 6, further comprising:
storing, in a first database dictionary at the primary container database, database metadata that defines the private pluggable database;
while replicating data, in the primary container database to the standby container database, the standby container database server replicating, to a second database dictionary at the standby container database, the database metadata that defines the private pluggable database; and
allocating resources, in the standby container database, to store data for the private pluggable database.

8. The computer-executed method of claim 7, wherein:
the standby container database server replicating the data, in the primary container database to the standby container database, is based, at least in part, on a set of redo entries recorded at the primary container database; and
allocating the resources, in the standby container database, to store data for the private pluggable database is performed in response to detecting, within the set of redo entries, one or more special redo markers that encode instructions to establish, within the standby container database, one or more aspects of the private pluggable database.

9. The computer-executed method of claim 7, wherein:
allocating the resources, in the standby container database, to store data for the private pluggable database comprises: establishing one or more tablespaces, within the standby container database, for the private pluggable database; and
executing the particular operation comprises storing data in at least one tablespace of the one or more tablespaces established for the private pluggable database.

10. The computer-executed method of claim 6, further comprising: generating redo entries that record one or more changes, made to the private pluggable database, in a redo log for the private pluggable database.

11. The computer-executed method of claim 6, wherein the private pluggable database is a particular private pluggable database, the method further comprising:
for each pluggable database in the standby container database, automatically establishing a corresponding private pluggable database in the standby container database;
wherein the read-only pluggable database corresponds to the particular private pluggable database.

12. The computer-executed method of claim 11, further comprising:
creating, within the particular private pluggable database, one or more tablespaces and one or more files;
wherein each tablespace of the one or more tablespaces created within the particular private pluggable database corresponds to a corresponding tablespace in the read-only pluggable database;
wherein each file of the one or more files created within the particular private pluggable database corresponds to a corresponding file in the read-only pluggable database; and
wherein the write operation, required by the query, is configured to write to a particular tablespace in the read-only pluggable database; and
wherein the particular operation performs the write operation to a tablespace, within the particular private pluggable database, that corresponds to the particular tablespace in the read-only pluggable database.

13. One or more non-transitory computer-readable media storing one or more sequences of instructions that, when executed by one or more processors, cause:
performing a refresh operation on a cloned pluggable database based, at least in part, on redo entries recorded for a source pluggable database;
wherein said performing the refresh operation comprises applying changes, reflected in the redo entries recorded for the source pluggable database, to the cloned pluggable database;
while performing the refresh operation on the cloned pluggable database, receiving a query over the cloned pluggable database;

determining a query logical timestamp (LT) for the query based on a first LT service that is maintained for the cloned pluggable database;

wherein the query LT reflects an LT of changes that have been applied, during the refresh operation, to the cloned pluggable database;

wherein the first LT service maintained for the cloned pluggable database is distinct from a second LT service that is maintained for a container database that contains the cloned pluggable database;

while performing the refresh operation, initiating execution of the query over the cloned pluggable database, wherein execution of the query is based, at least in part, on the query LT.

14. The one or more non-transitory computer-readable media of claim 13, wherein the one or more sequences of instructions further comprise instructions that, when executed by one or more processors, cause:

while performing the refresh operation:
determining an update LT, from the source pluggable database, at which all changes from the source pluggable database have been committed in the cloned pluggable database; and
updating a current LT, maintained by the first LT service maintained for the cloned pluggable database, to be the update LT.

15. The one or more non-transitory computer-readable media of claim 13, wherein the one or more sequences of instructions further comprise instructions that, when executed by one or more processors, cause:

receiving a second query over a second pluggable database contained by the container database;
determining a second LT for the second query based on the second LT service that is maintained for the container database; and
executing the second query over the second pluggable database based, at least in part, on the second LT.

16. The one or more non-transitory computer-readable media of claim 13, wherein:

determining the query LT comprises determining a current LT that is maintained by the first LT service; and
executing the query over the cloned pluggable database based, at least in part, on the query LT comprises retrieving, from the cloned pluggable database, data that has been tagged with an LT that is at most the query LT.

17. The one or more non-transitory computer-readable media of claim 13, wherein:

each of the first LT service and the second LT service identify a current LT; and
the current LT identified by the first LT service and the current LT identified by the second LT service are different LTs.

18. One or more non-transitory computer-readable media storing one or more sequences of instructions that, when executed by one or more processors, cause:

executing a first query over a read-only pluggable database in a standby container database managed by a standby container database server;
wherein the standby container database server replicates data in a primary container database to the standby container database;
wherein the standby container database comprises a replica of data in the primary container database;
wherein the query requires a write operation;
wherein executing the query further comprises:
automatically generating a particular operation that performs the write operation in a private pluggable database in the standby container database,
determining a logical timestamp (LT) for the particular operation based on a first LT service maintained for the private pluggable database,
wherein the first LT service tracks logical timestamps of changes made within the private pluggable database,
wherein the first LT service maintained for the private pluggable database is distinct from a second LT service maintained for the standby container database, and
executing the particular operation based, at least in part, on the LT determined for the particular operation.

19. The one or more non-transitory computer-readable media of claim 18, wherein the one or more sequences of instructions further comprise instructions that, when executed by one or more processors, cause:

storing, in a first database dictionary at the primary container database, database metadata that defines the private pluggable database;
while replicating data, in the primary container database to the standby container database, the standby container database server replicating, to a second database dictionary at the standby container database, the database metadata that defines the private pluggable database; and
allocating resources, in the standby container database, to store data for the private pluggable database.

20. The one or more non-transitory computer-readable media of claim 19, wherein:

the standby container database server replicating the data, in the primary container database to the standby container database, is based, at least in part, on a set of redo entries recorded at the primary container database; and
allocating the resources, in the standby container database, to store data for the private pluggable database is performed in response to detecting, within the set of redo entries, one or more special redo markers that encode instructions to establish, within the standby container database, one or more aspects of the private pluggable database.

21. The one or more non-transitory computer-readable media of claim 19, wherein:

allocating the resources, in the standby container database, to store data for the private pluggable database comprises: establishing one or more tablespaces, within the standby container database, for the private pluggable database; and
executing the particular operation comprises storing data in at least one tablespace of the one or more tablespaces established for the private pluggable database.

22. The one or more non-transitory computer-readable media of claim 18, wherein the one or more sequences of instructions further comprise instructions that, when executed by one or more processors, cause: generating redo entries that record one or more changes, made to the private pluggable database, in a redo log for the private pluggable database.

23. The one or more non-transitory computer-readable media of claim 18, wherein the private pluggable database is a particular private pluggable database, and the one or more sequences of instructions further comprise instructions that, when executed by one or more processors, cause:

for each pluggable database in the standby container database, automatically establishing a corresponding private pluggable database in the standby container database;

wherein the read-only pluggable database corresponds to the particular private pluggable database.

24. The one or more non-transitory computer-readable media of claim 23, wherein the one or more sequences of instructions further comprise instructions that, when executed by one or more processors, cause:

creating, within the particular private pluggable database, one or more tablespaces and one or more files;

wherein each tablespace of the one or more tablespaces created within the particular private pluggable database corresponds to a corresponding tablespace in the read-only pluggable database;

wherein each file of the one or more files created within the particular private pluggable database corresponds to a corresponding file in the read-only pluggable database; and wherein the write operation, required by the query, is configured to write to a particular tablespace in the read-only pluggable database; and wherein the particular operation performs the write operation to a tablespace, within the particular private pluggable database, that corresponds to the particular tablespace in the read-only pluggable database.

* * * * *